(12) United States Patent
Daikokuya et al.

(10) Patent No.: US 7,725,664 B2
(45) Date of Patent: May 25, 2010

(54) CONFIGURATION DEFINITION SETUP METHOD FOR DISK ARRAY APPARATUS, AND DISK ARRAY APPARATUS

(75) Inventors: Hidejirou Daikokuya, Kawasaki (JP); Mikio Ito, Kawasaki (JP); Kazuhiko Ikeuchi, Kawasaki (JP); Shinya Mochizuki, Kawasaki (JP); Katsuhiko Nagashima, Kawasaki (JP); Akihito Kobayashi, Kawasaki (JP); Koji Uchida, Kawasaki (JP); Shinichi Nishizono, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 98 days.

(21) Appl. No.: 11/239,230

(22) Filed: Sep. 30, 2005

(65) Prior Publication Data
US 2006/0179219 A1 Aug. 10, 2006

(30) Foreign Application Priority Data
Feb. 9, 2005 (JP) .............................. 2005-33532

(51) Int. Cl.
G06F 12/00 (2006.01)
G06F 3/06 (2006.01)
G06F 13/00 (2006.01)
G06F 13/28 (2006.01)

(52) U.S. Cl. .................. 711/154; 711/112; 711/114; 711/4

(58) Field of Classification Search ................ None
See application file for complete search history.

(56) References Cited

U.S. PATENT DOCUMENTS

| | | | |
|---|---|---|---|
| 5,535,409 A | 7/1996 | Larvoire et al. | |
| 6,081,892 A | 6/2000 | Lomas | |
| 6,324,633 B1 * | 11/2001 | Flake et al. | 711/173 |
| 7,117,141 B2 | 10/2006 | Kaji et al. | |
| 7,127,557 B2 | 10/2006 | Ito et al. | |
| 2003/0225934 A1 | 12/2003 | Kaji et al. | |
| 2003/0236945 A1 * | 12/2003 | Nahum | 711/114 |

(Continued)

FOREIGN PATENT DOCUMENTS

JP 3-189720 8/1991

(Continued)

OTHER PUBLICATIONS

Japanese Office Action issued on Apr. 7, 2009 in corresponding Japanese Patent Application 2005-033532.

*Primary Examiner*—Matt Kim
*Assistant Examiner*—Ralph A Verderamo, III
(74) *Attorney, Agent, or Firm*—Staas & Halsey LLP

(57) ABSTRACT

A system creates a configuration definition table to be used for accessing a physical disk according to a host I/O request, to decrease a memory size of the configuration definition table even if common firmware is used for models with different scales. For this, a model correspondence table to show the definition of each model is provided in a configuration setup processing module, the maximum values of this model are recorded in a memory based on this content, and a memory area for each item is secured. And the actual content of the configuration definition is developed on the secured memory. Therefore even for a diversity of models, the memory size of the configuration definition table can be decreased to a size matching the model, with common firmware regardless the model.

11 Claims, 17 Drawing Sheets

U.S. PATENT DOCUMENTS

2004/0133743 A1 * 7/2004 Ito et al. .................... 711/114

FOREIGN PATENT DOCUMENTS

| JP | 5-143319 | 6/1993 |
| JP | 09-054744 | 2/1997 |
| JP | 11-85480 | 3/1999 |
| JP | 2003-345518 | 12/2003 |
| JP | 2004-213064 | 7/2004 |

* cited by examiner

FIG. 11
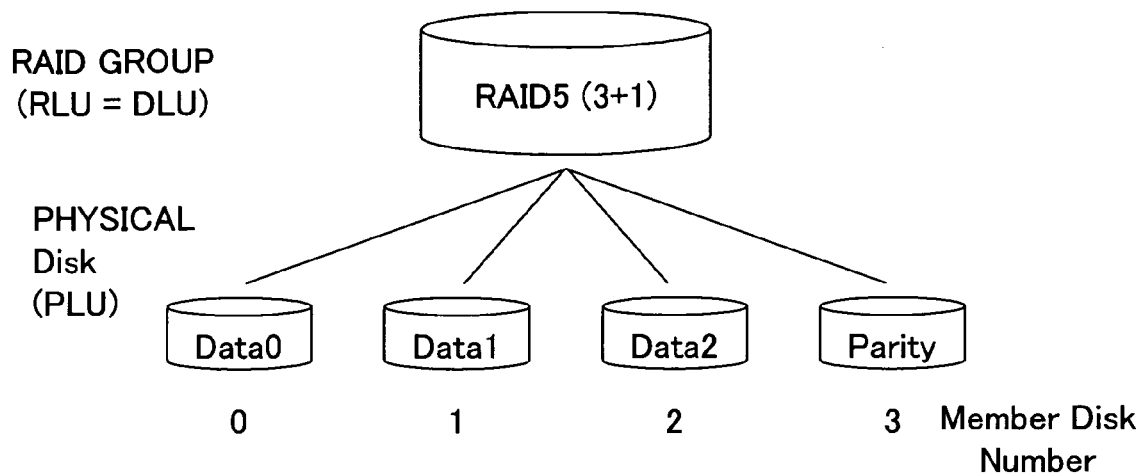
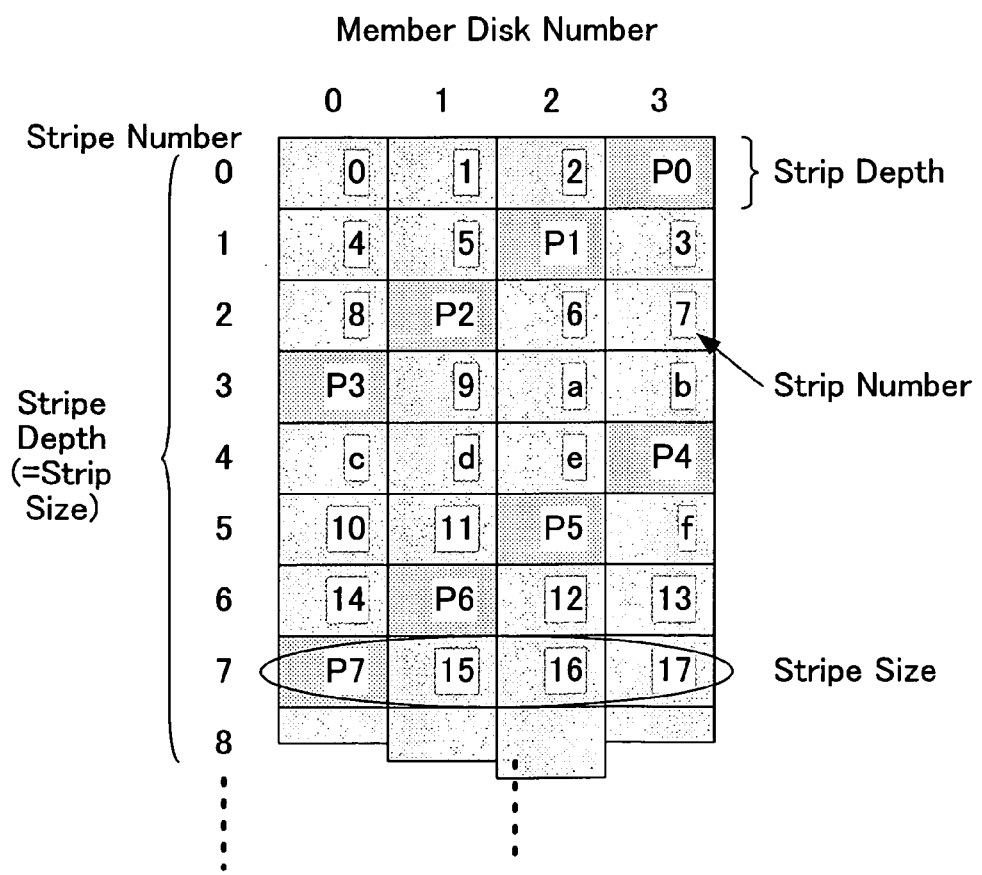

FIG. 17

| | MINIMUM MODEL | MAX MODEL |
|---|---|---|
| HOST LUN MAX NUMBER | 1920 | 30720 |
| RAID GROUP MAX NUMBER | 120 | 1920 |
| VIRTUAL DISK MAX NUMBER | 120 | 1920 |
| PHYSICAL DISK MAX NUMBER | 240 | 3840 |
| NECESSARY MEMORY SIZE | (1920+120+120+240) × 256<br>=614,400Byte<br>=0.6144MByte | (30720+1920+1920+3840) × 256<br>=9,830,400Byte<br>=9.8304MByte |

CONFIGURATION DEFINITION SETUP METHOD FOR DISK ARRAY APPARATUS, AND DISK ARRAY APPARATUS

CROSS-REFERENCE TO RELATED APPLICATIONS

This application is based upon and claims the benefit of priority from the prior Japanese Patent Application No. 2005-033532, filed on Feb. 09, 2005, the entire contents of which are incorporated herein by reference.

BACKGROUND OF THE INVENTION

1. Field of the Invention

The present invention relates to a configuration definition setup method for a disk array apparatus for setting configuration definition information used by the firmware of a disk array apparatus on which a number of disk devices for storing data are installed, and to a disk array apparatus, and more particularly to a configuration definition setup method for a disk array apparatus for making the storage size of the configuration definition information variable according to a different scale of a model, and to a disk array apparatus.

2. Description of the Related Art

Recently as various data are computerized and handled on computers, a data storage apparatus (external storage apparatus) which can efficiently store large volumes of data with high reliability, independently from a host computer which executes data processing, is increasingly more important.

For this data storage apparatus, a disk array apparatus comprising a great number of disk devices (e.g. magnetic disks and optical disks) and a disk controller for controlling these disk devices is used. This disk array apparatus can receive disk access requests simultaneously from a plurality of host computers and control a great number of disks.

User demands for such disk array apparatus vary, so models in a plurality of scales must be provided according to the purpose of a user. In other words, the number of disk devices to be installed changes depending on the purpose of a user. As a result various models are demanded, for example, from a large scale disk array apparatus which can control a disk device group comprised of several thousand or more disk devices with several hundred terabytes or more of storage capacity by itself, to a small scale disk array device which has several tens of disk devices.

A change of the configuration of the disk array apparatus means that it is necessary to set the configuration information for controlling the disk devices according to the scale. In other words, in the case of a disk array apparatus, the configuration information is the configuration definition in the firmware of the controller, and is internal information unique to the disk array apparatus. Examples are the information and status of each disk device being installed, the set up contents of LUN (Logical Unit Number) and a RAID group, the hardware status of the controller and the type of the installed adapter.

The minimum required memory size of the configuration information differs depending on the model. Conventionally in a computer system, the configuration information is automatically created according to the configuration of the connected devices, and is stored in memory (e.g. Japanese Patent Application Laid-Open No. H9-54744).

In a disk array apparatus, on the other hand, the configuration information itself is diverse depending on the model. For example, since the number of installed disks is several tens to several thousands, in the case of each model of product for the low end/mid-range where the number of installed disks is little, so configuration information creation firmware is created for each model because of the relationship with the memory to be installed. In the case of each model of product for high end where the number of installed disks is large, a memory for the configuration definition for the maximum number of disk devices that can be installed is secured, although firmware is the same for all the models.

With the conventional method for creating firmware for each model, the development cost increases and the evaluation-manpower thereof also increases, which may cause delays in providing new disk array apparatus to market.

With the conventional method for creating a configuration definition using common firmware, on the other hand, the memory capacity for the maximum configuration must be secured. This is because the required memory capacity is in proportion to the number of installed disk devices and to the number of LUNs (Logical Unit Number), so the required cache size of the memory changes depending on the model. Therefore the memory size to be installed in the disk array apparatus must be decided depending on the cache size and the memory size to be used for the configuration definition. This operation is extremely troublesome when the number of different models increases, so it is effective to fix the memory size to be used for the configuration definition to the size required for the maximum configuration.

However if the number of installed disk devices is different, the memory size to be used for the configuration definition also changes, so in the case of the conventional method of securing the memory size for the maximum configuration, unnecessary memory is installed. And installing unnecessary memory increases the price of the product, which runs counter to recent demands for a low price apparatus. In particular, for a model where an enormous number of disk devices are installed is demanded, with this method of securing the memory size for the maximum configuration for a great number of models in which the range of the number of installed disk devices is wide, the price of unnecessary memory becomes high with respect to the apparatus price which can no longer be ignored.

SUMMARY OF THE INVENTION

With the foregoing in view, it is an object of the present invention to provide a configuration definition setup method for a disk array apparatus and the disk array apparatus thereof for decreasing the memory size of the configuration definition to the size for the number of installed disk devices, even if the configuration definition is automatically created using common firmware.

It is another object of the present invention to provide a configuration definition setup method for a disk array apparatus and the disk array apparatus thereof for decreasing the memory size of the configuration definition to the size for the number of installed disk devices, even if the configuration definition is automatically created using common firmware, so as to decrease the apparatus price.

It is still another object of the present invention to provide a configuration definition setup method for a disk array apparatus and the disk array apparatus thereof for decreasing the memory size of the configuration definition to be the size for the number of installed disk devices, even if the configuration definition is automatically created using common firmware, so as to use the cache area of the memory effectively.

It is still another object of the present invention to provide a configuration definition setup method for a disk array apparatus and the disk array apparatus thereof for decreasing the memory size of the configuration definition to the size of the number of installed disk devices, even if the configuration definition is automatically created using common firmware, so as to provide a diversity of models at. appropriate prices.

To achieve these objects, the present invention is a method for setting up the configuration definition of a disk array apparatus that accesses the connected disk devices according to an I/O request sent from a host and executes the I/O request, having steps of: referring to a model correspondence table for storing a host logical space of each model and a maximum number of the disk devices by a model name indicating a scale of the disk array apparatus and reading the corresponding host logical space and the maximum number of the disk devices; calculating a starting address of a memory for storing the configuration information of the host logical space and the disk devices from the host logical space and the maximum number of the disk devices that were read; and storing the configuration information from the calculated starting address to the memory, and creating a configuration definition table for accessing the disk device.

The present invention is also a disk array apparatus for accessing the connected disk devices according to an I/O request sent from a host and executing the I/O request, having: a non-volatile memory for storing a model name to indicate a scale of the disk array apparatus, and a model correspondence table storing a host logical space and the maximum number of the disk devices of the respective model; a memory for storing a configuration definition table for accessing the disk device; and a control unit for referring to the configuration definition table and accessing the disk device according to the sent I/O request. And the control unit refers to the model correspondence table by the model name, reads the corresponding host logical space and the maximum number of the disk devices, calculates a starting address of the memory for storing the configuration information of the host logical space and the disk devices from the host logical space and the maximum number of the disk devices, stores the configuration information in the memory from the calculated starting address, and creates the configuration definition table.

It is preferable that the present invention further has a step of storing the calculated starting address of the host logical space and the disk devices in the memory.

Also according to the present invention, it is preferable that the reading step has a step of reading the host logical space, a RAID space, a virtual disk space and the maximum number of the disk devices according to the model name.

Also according to the present invention, it is preferable that the storing step further has a step of storing the host logic space and the maximum number of the disk devices that were read in the memory.

Also according to the present invention, it is preferable that the calculation step has a step of calculating the respective starting address from the host logical space, the RAID space, the virtual disk space and the maximum number of the disk devices that were read.

Also according to the present invention, it is preferable that the creation step comprises a step of creating a configuration definition table for calculating a physical block address of the disk device from the host logical block address.

Also it is preferable that the present invention further comprises a step of storing the created configuration definition table in a non-volatile memory.

Also according to the present invention, it is preferable that the storing step has a step of storing the configuration definition table in an area other than the cache area of a memory used for the cache area of the disk device.

According to the present invention, information to indicate the definition of each model (model correspondence table) is provided for the configuration setup processing, and based on this content, the maximum value of the model is recorded in a memory, and also a memory area for the respective item is secured. And the actual content of the configuration definition is developed after this on the memory secured from the backup disk or flash ROM. Therefore even for a diversity of models, the memory size of the configuration definition table can be decreased to the size matching the model, and common firmware can be used regardless the model. In other words, the model correspondence table is provided, so the memory area with a memory size matching the model can be secured before storing the actual content of the configuration definition.

The configuration definition table is referred to via a pointer, so the same method can be used for reference regardless the model.

BRIEF DESCRIPTION OF THE DRAWINGS

FIG. 11 is a diagram depicting the logical mapping of the RAID 5 in FIG. 10;

FIG. 17 is a table describing the disk array apparatus in FIG. 15 and the disk array apparatus in FIG. 16 and the required memory size of the configuration definition table thereof.

DESCRIPTION OF THE PREFERRED EMBODIMENTS

Embodiments of the present invention will now be described in the sequence of the disk array apparatus, configuration definition setup processing, access processing of the disk device using a configuration definition and other embodiments.

Disk Array Apparatus

Figure 1:
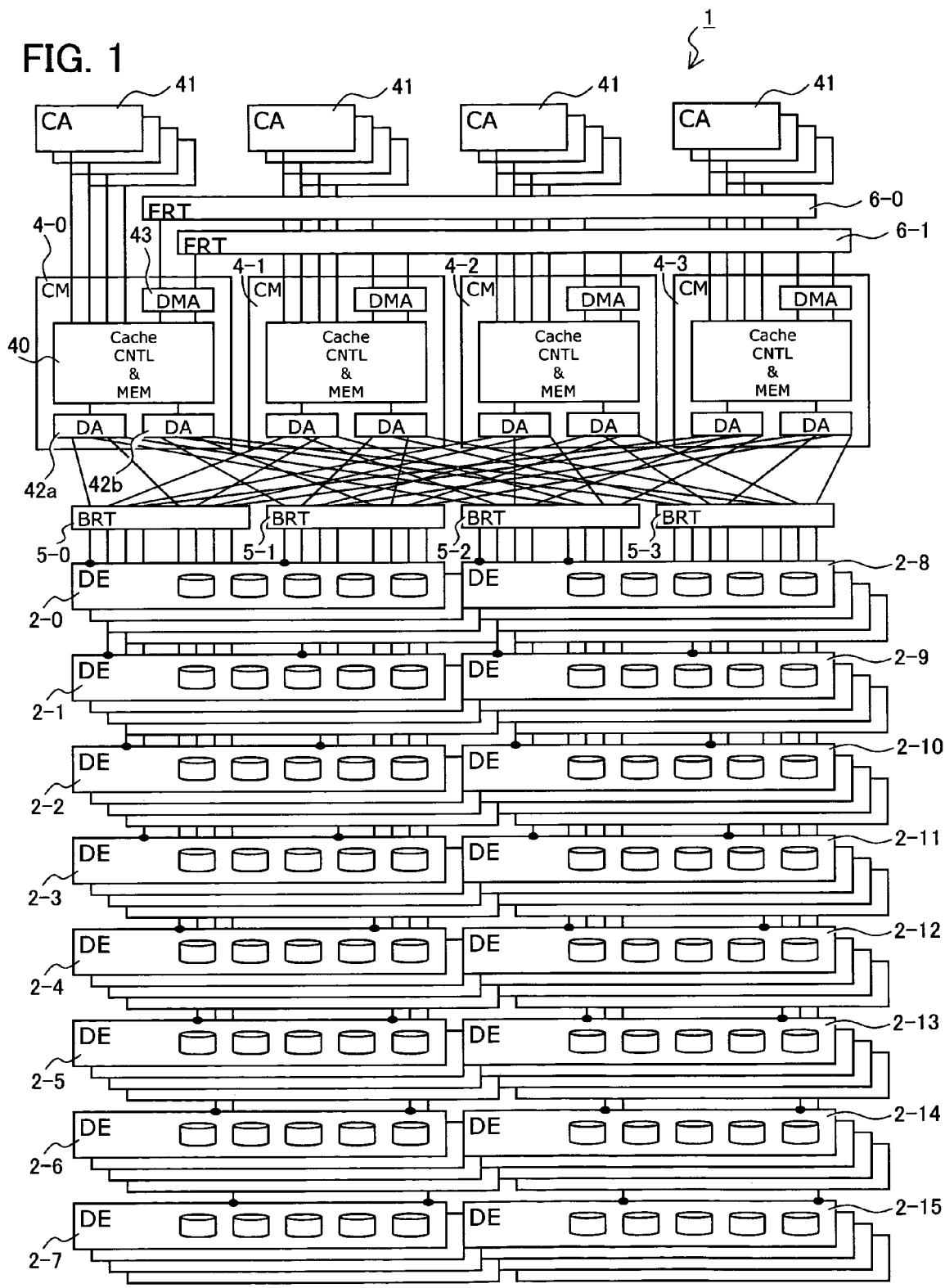
FIG. 1 is a block diagram depicting the disk array apparatus according to an embodiment of the present invention.
Figure 2:
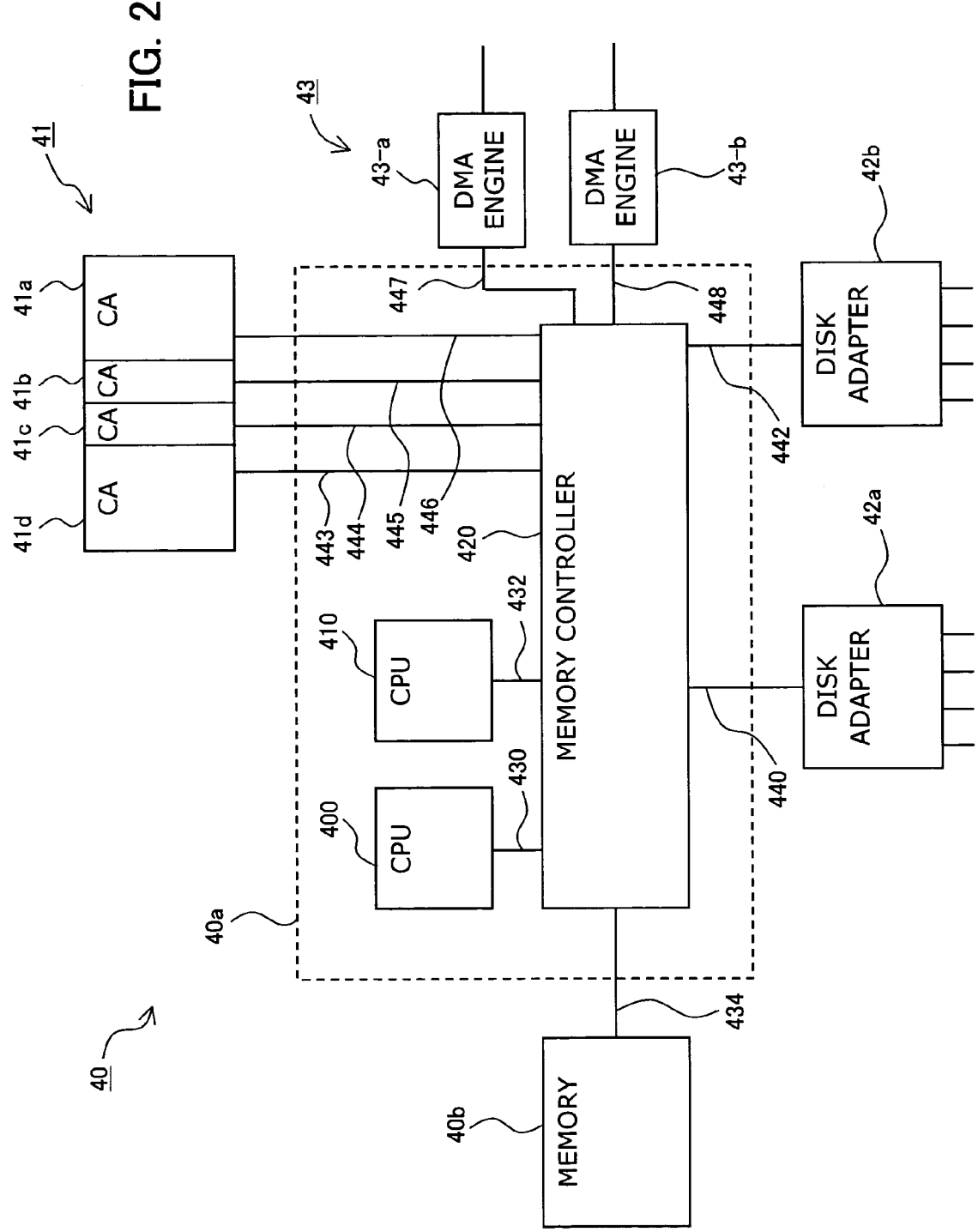
FIG. 2 is a block diagram depicting a control module in FIG. 1.
Figure 3:
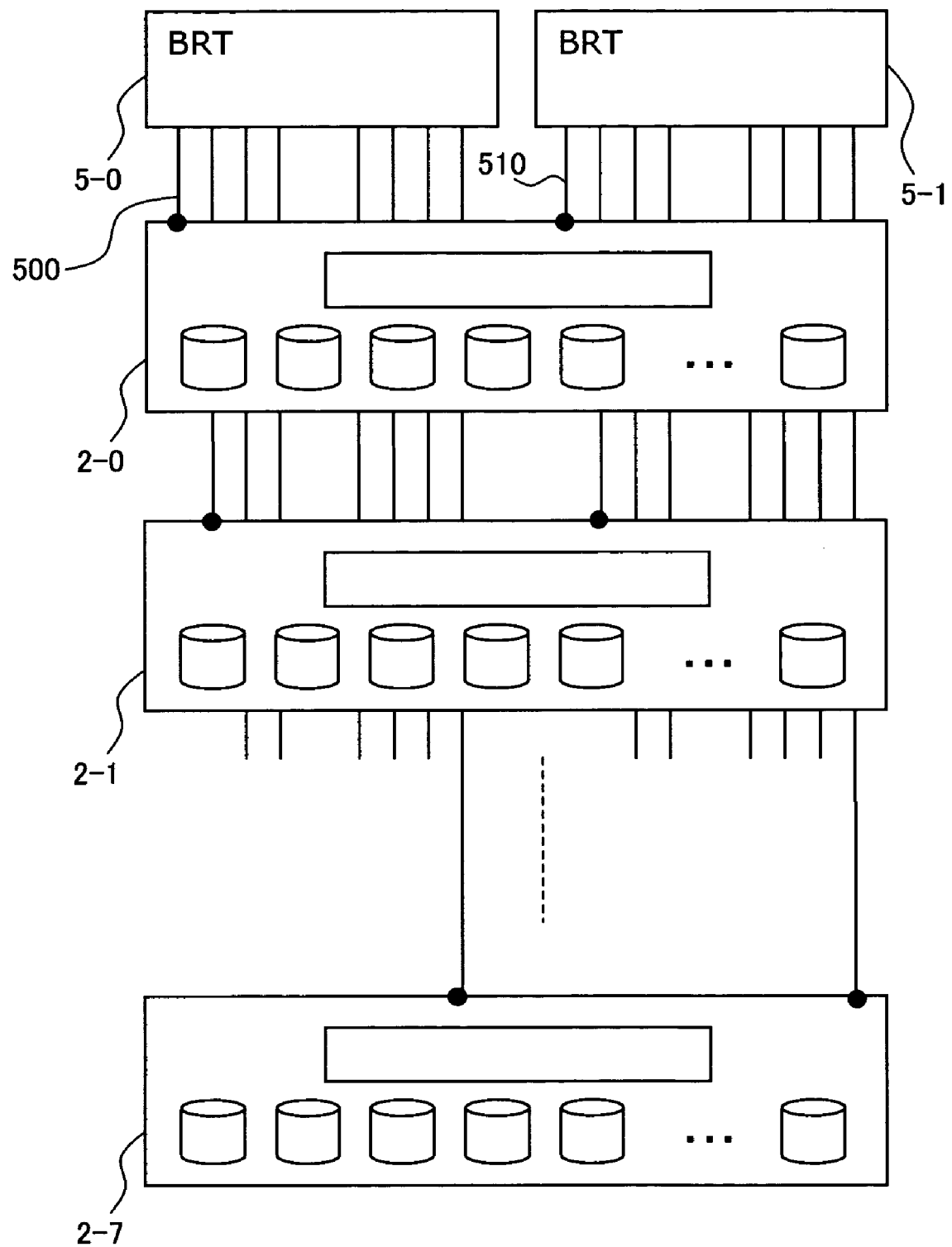
FIG. 3 is a block diagram depicting the back end routers and the disk enclosures in FIG. 1 and FIG. 2.
Figure 4:
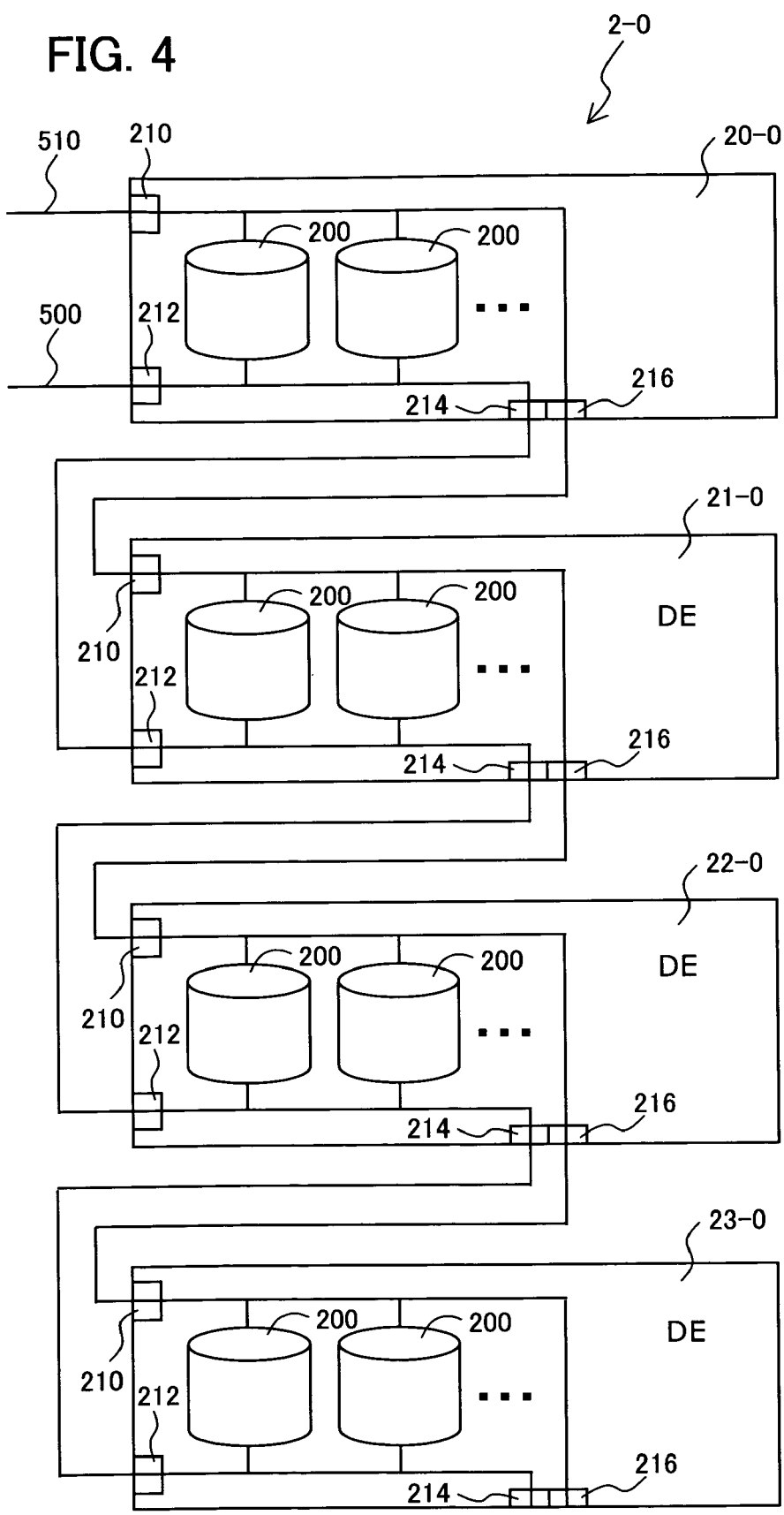
FIG. 4 is a block diagram depicting the disk enclosures in FIG. 1 and FIG. 3.

FIG. 1 is a block diagram depicting the disk array apparatus according to an embodiment of the present invention, FIG. 2 is a block diagram depicting the control module in FIG. 1, FIG. 3 is a block diagram depicting the back end routers and disk enclosures in FIG. 1, and FIG. 4 is a block diagram depicting the disk enclosures in FIG. 1 and FIG. 3.

FIG. 1 shows an example of a medium scale disk array apparatus having four control modules. As FIG. 1 shows, the disk array apparatus 1 has a plurality of disk enclosures 2-0-2-15 for holding data, a plurality (four in this case) of control modules 4-0-4-3 disposed between a host computer (data processing apparatus), which is not illustrated, and the plurality of disk enclosures 2-0-2-15, a plurality (four in this case) of back end routers (first switch unit: denoted as BRT in figures and hereafter referred to as BRT) 5-0-5-3 disposed between this plurality of control modules 4-0-4-3 and the plurality of disk enclosures 2-0-2-15, and a plurality (two in this case) of front end routers (second switch unit: denoted as FRT in figures, and hereafter referred to as FRT) 6-0-6-1.

Each one of the control modules 4-0-4-3 has a controller 40, a channel adapter (first interface unit: denoted as CA in figures) 41, disk adapters (second interface unit: denoted as DA in figures) 42$a$ and 42$b$, and DMA (Direct Memory Access) engine (communication unit: denoted as DMA in figures) 43.

In FIG. 1, the reference symbols of the controller "40", the disk adapters "42$a$" and "42$b$" and DMA "43" are denoted only in the control module 4-0, and are omitted in the other control modules 4-1-4-3 to simplify drawings.

Now the control modules 4-0-4-3 will be described with reference to FIG. 2. The controller 40 performs read/write processing based on a processing request (read request or write request) from the host computer, and has the memory 40$b$ and the control unit 40$a$.

The memory 40$b$ has a cache area for holding a part of the data held in a plurality of disks in the disk enclosures 2-0-2-15, that is, for playing the role of a cache for the plurality of disks, a configuration definition storage area and other work areas.

The control unit 40$a$ controls the memory 40$b$, the channel adapter 41, the disk (device) adapter 42 and the DMA 43. This control unit 40$a$ has one or a plurality (two in FIG. 2) of CPUs 400 and 410 and a memory controller 420. The memory controller 420 controls the read/write of the memory and switches the paths.

The memory controller 420 is connected with the memory 40$b$ via the memory bus 434, and is connected with the CPUs 400 and 410 via the CPU buses 430 and 432, and the memory controller 420 is also connected to the disk adapters 42$a$ and 42$b$ via the four-lane high-speed serial buses (e.g. PCI-Express) 440 and 442.

In the same way, the memory control 420 is connected to the channel adapters 41 (four-channel adapters 41$a$, 41$b$, 41$c$ and 41$d$ in this case) via the four-lane high-speed serial buses (e.g. PCI-Express) 443, 444, 445 and 446, and is connected to the DMA 43 (two DMAs: 43-$a$ and 43-$b$ in this case) via the four-lane high-speed serial buses (e.g. PCI-Express) 447 and 448.

This high-speed serial bus, such as PCI-Express™, communicates in packets, and by installing a plurality of lanes of the serial buses, communication with little delay and fast response speed, that is low latency, becomes possible even if the number of signal lines is decreased.

The channel adapters 41$a$-41$d$ are interfaces for the host computers, and the channel adapters 41$a$-41$d$ are connected to different computers respectively. It is preferable that the channel adapters 41$a$-41$d$ are connected to the interface unit of the corresponding host computer respectively via a bus, such as Fiber Channel or Ethernet®, and in this case an optical fiber or coaxial cable is used as the bus.

Each of the channel adapters 41$a$-41$d$ is constructed as a part of each control module 4-0-4-3. These channel adapters 41$a$-41$b$ must support a plurality of protocols as an interface unit between the corresponding host computer and the computer modules 4-0-4-3.

Since a protocol to be installed is different depending on the corresponding host computer, each channel adapter 41$a$-41$d$ is mounted on a printed circuit board which is different from the controller 40, which is a major unit of the control modules 4-0-4-3, so that if necessary replacement is easy.

For a protocol with a host computer which the channel adapters 41$a$-41$d$ support, Fiber Channel and iSCSI (Internet Small Computer System Interface), which supports Ethernet®, for example, are used.

Each channel adapter 41$a$-41$d$ is directly connected with the controller 40 via a bus designed for connecting an LSI (Large Scale Integration) and a printed circuit board, such as a PCI-Express bus, as mentioned above. By this, high throughput, which is demanded between each channel adapter 41$a$-41$d$ and the controller 40, can be implemented.

Each disk adapter 42$a$ and 42$b$ is an interface for each disk drive of the disk enclosures 2-0-2-15, and is connected to the BRT 5-0-5-3 connected to the disk enclosures 2-0-2-15, and has four FC (Fiber Channel) ports in this case.

Each disk adapter 42$a$ and 42$b$ is directly connected to the controller 40 via a bus designed for connecting an LSI (Large Scale Integration) and a printed circuit board, such as a PCI-Express bus, as mentioned above. By this, high throughput, which is demanded between each disk adapter 42$a$ and 42$b$ and the controller 40, can be implemented.

As FIG. 1 and FIG. 3 show, BRT 5-0-5-3 are multi-port switches which communicably connect the disk adapters 42$a$ and 42$b$ of each control module 4-0-4-3 and each disk enclosure 2-0-2-15 by selectively switching.

As FIG. 3 shows, each disk enclosure 2-0-2-7 is connected to a plurality (two in this case) of BRTs 5-0-5-1. As FIG. 4 shows, each disk enclosure 2-0 has a plurality (e.g. 15) of disk drives 200 installed, each of which has two ports. For this disk enclosure 2-0, the required number of unit disk enclosures 20-0 and 23-0 having four connection ports 210, 212, 214 and 216 are connected in series, so as to increase capacity. In this example, a maximum of four unit disk enclosures 20-0-20-3 can be connected.

In the unit disk enclosures 20-0-23-0, each port of each disk drive 200 is connected to two ports 210 and 212 by a pair of FC cables from the two ports 210 and 212. These two ports 210 and 212 are connected to a different BRT 5-0 and 5-1, as described in FIG. 3.

As FIG. 1 shows, the disk adapters 42$a$ and 42$b$ of each control module 4-0-4-3 are connected to all the disk enclosures 2-0-2-15 respectively. In other words, the disk adapter 42$a$ of each control module 4-0-4-3 is connected to the BRT 5-0 connected to the disk enclosures 2-0-2-7 (see FIG. 3), the BRT 5-0 connected to the disk enclosures 2-0-2-7, the BRT 5-2 connected to the disk enclosures 2-8-2-15 and the BRT 5-2 connected to the disk enclosures 2-8-2-15 respectively.

In the same way, the disk adapter 42$b$ of each control module 4-0-4-3 is connected to the BRT 5-1 connected to the disk enclosures 2-0-2-7 (see FIG. 3), the BRT 5-1 connected to the disk enclosures 2-0-2-7, the BRT 5-3 connected to the disk enclosures 2-8-2-15, and the BRT 5-3 connected to the disk enclosures 2-8-2-15 respectively.

In this way, each disk enclosure 2-0-2-15 is connected to a plurality (two in this case) of BRTs, and different disk adapters 42a and 42b in identical control modules 4-0-4-3 are connected to each of the two BRTs connected to identical disk enclosures 2-0-2-15 respectively.

By this configuration, each control module 4-0-4-3 can access all the disk enclosures (disk drives) 2-0-2-15 through any disk adapter 42a and 42b and through any path.

Also as shown in FIG. 2, each disk adapter 42a and 42b is connected to the corresponding BRT 5-0-5-3 via a bus, such as Fiber Channel or Ethernet®. In this case, the bus is installed on the printed circuit board of the back panel by electrical wiring.

The disk adapter 42a and 42b of each control module 4-0-4-3 and the BRT 5-0-5-3 are in a one-to-one mesh connection so as to be connected to all the disk enclosures as mentioned above, therefore as the number of control modules 4-0-4-3 (that is as the number of disk adapters 42a and 42b) increases, the number of connections increases and the connection relationship becomes more complicated, which makes it difficult to perform physical mounting. However when Fiber Channel which has less number of signals constituting the interface is used, for the connection between the disk adapters 42a and 42b and the BRT 5-0-5-3, mounting on a printed circuit board becomes possible.

When each disk adapter 42a and 42b and the corresponding BRT 5-0-5-3 are connected via Fiber Channel, the BRT 5-0-5-3 becomes the switch of the Fiber Channel. Each BRT 5-0-5-3 and the corresponding disk enclosures 2-0-2-15 can also be connected by Fiber Channel, and in this case optical cables 500 and 510 are used since the modules are different.

As FIG. 1 shows, the DMA engine 43 mutually communicates with each control module 4-0-4-3, and is in-charge of the communication and data transfer processing with other control modules. Each DMA engine 43 of each control module 4-0-4-3 is constructed as a part of a control module 4-0-4-3, and is mounted on the board of the controller 40, which is a major unit of the control module 4-0-4-3. And the DMA engine 43 is directly connected with the controller 40 via the above mentioned high-speed serial bus, and mutually communicates with the DMA engine 43 of another control module 4-0-4-3 via the FRTs 6-0 and 6-1.

The FRTs 6-0 and 6-1 are connected to the DMA engines 43 of a plurality (three or more, four in this case) of the control modules 4-0-4-3, and selectively switches these control modules 4-0-4-3 so as to enable communication.

Because of this configuration, each DMA engine 43 of each control module 4-0-4-3 executes the communication and data transfer processing (e.g. mirroring processing) generated according to an access request from the host computer, between the controller 40 connected to the DMA engine 43 itself and the controller 40 of another control module 4-0-4-3, via the FRTs 6-0 and 6-1.

As FIG. 2 shows, the DMA engine 43 of each control module 4-0-4-3 is comprised of a plurality (two in this case) of DMA engines 43-a and 43-b, and each of these two DMA engines 43-a and 43-b uses two FRTs 6-0 and 6-1 respectively.

The DMA engines 43-a and 43-b are connected to the controller 40 as shown in FIG. 2, via a PCI-Express bus, for example. In other words, in the case of the communication and data transfer (DMA) processing between each control module 4-0-4-3 (that is, between the controller 40 of each control module 4-0-4-3) where the data transfer volume is high, it is preferable to decrease the time required for communication control, for which high throughput and low latency (fast response speed) are demanded. Therefore as FIG. 1 and FIG. 2 show, the DMA engine 43 of each control module 4-0-4-3 and the FRTs 6-0 and 6-1 are connected via a bus using high high-speed serial transfer (PCI-Express or Rapid-IO) designed such that both high throughput and low latency are satisfied.

PCI-Express and Rapid-IO use a 2.5 Gbps high-speed serial transfer, and a small amplitude differential interface called LVDS (Low Voltage Differential Signaling) is used for these bus interfaces.

Figure 5:
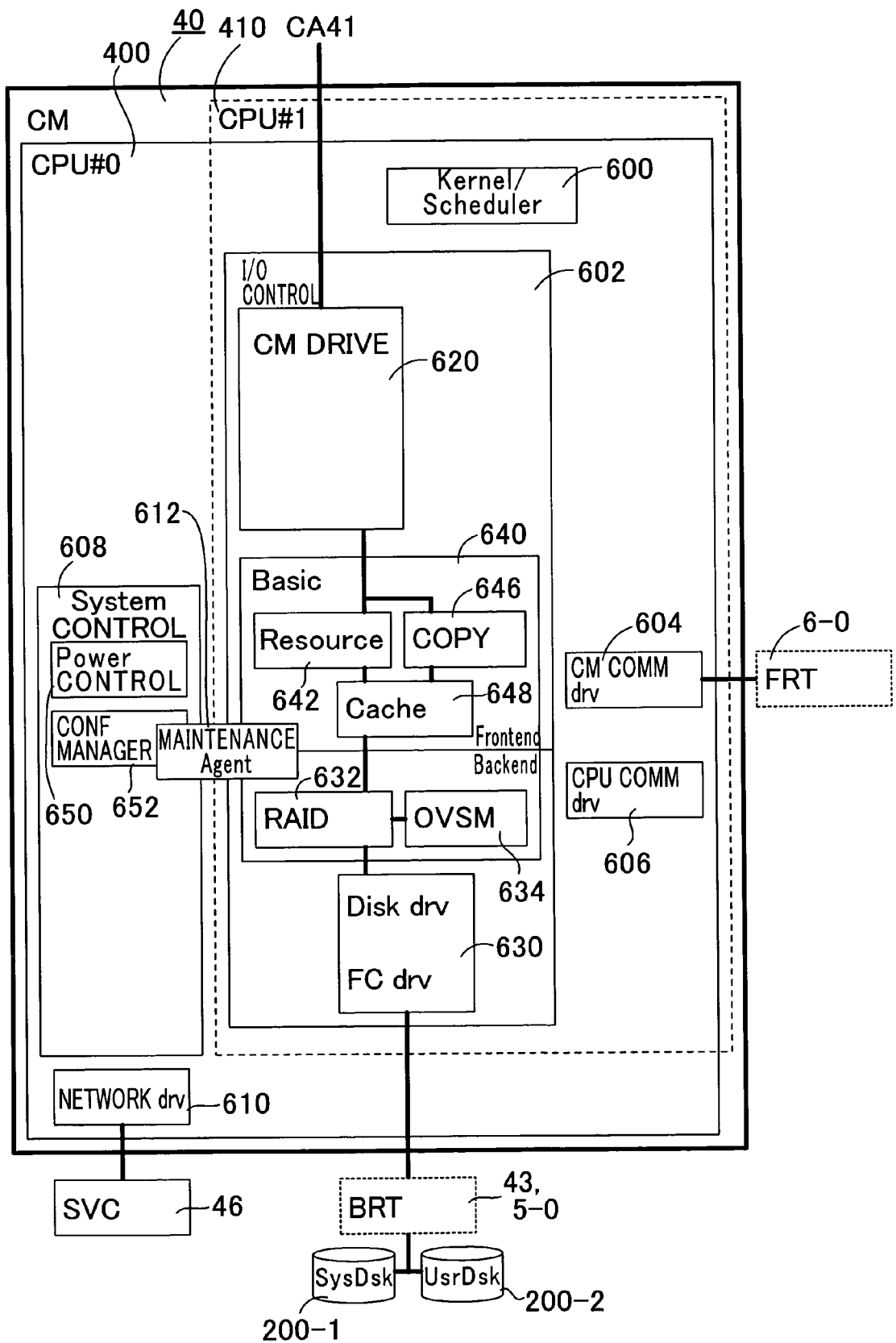
FIG. 5 is a functional block diagram depicting the firmware of the control module in FIG. 1.

FIG. 5 is a block diagram depicting a program module of the software to be executed by the CPU 400 (410). As FIG. 5 shows, the software module has a kernel/scheduler 600, an IO control module 602, an inter-CM communication driver 604, an inter-CPU communication driver 606, a system control module 608 and a network driver 610.

The kernel/scheduler 600 is an operating system, such as MS-DOS®. The IO control module 602 has a CM-CA driver 620, a basic module 640 and a CM-DA driver 630. The CM-CA driver 620 drives the CA 41.

The basic module 640 has a front end that has a resource thread (resource control module) 646 for managing resources, a copy thread (copy control module) 646 for performing copying processing, and a cache thread (cache memory control module) 648 for controlling the cache memory of the memory 40b, and a back end that has a RAID thread (RAID control module) 632 for performing RAID configuration control, and an OVSM thread (OVSM control module) 634.

The OVSM thread 634 performs the scheduling of quick format (QF) and logic apparatus expansion (LDE), logical format (LF) requests to the RAID thread 632, and LDE progress management.

The maintenance agent 612 sends various notifications to the OVSM thread 634. The CM-DA driver 630 drives the CM 43. The inter-CM communication driver 604 drives the DMA 43 and performs communication between CMs via the FRT 6-0. The inter-CPU communication driver 606 performs communication with another CPU 410.

The system control module 608 has a power control module 650 and a configuration management module 652. The configuration management module 652 creates the configuration definition table (described later in FIG. 7 and FIG. 8) including the RLU (RAID Logical Unit) table for the configuration definition in the memory 40b, according to the model specifications from the service controller 46 via the network driver 610. The service controller 46, which is not illustrated in FIG. 1, is common to each CM.

The disk drive 200, which is disposed in the disk enclosure connected to the DA 43 and the BRT 5-0, is divided into the system disk 200-1 and the user disk 200-2, and this module is stored in the system disk 200-1, and the configuration definition table is also stored here.

According to the present invention, the configuration definition table of a model is created according to the major configuration definition of the configuration management module 652, as described later in FIG. 6 and FIG. 8. And as FIG. 9 shows, the resource module 642 and the RAID module 632 refer to the configuration definition table, and convert the LUN (Logical Unit Number) from the host into the PLBA (PhysicaL Block Address) of the physical disk, and accesses the physical disk 200.

Configuration Definition Setup Processing

Figure 6:
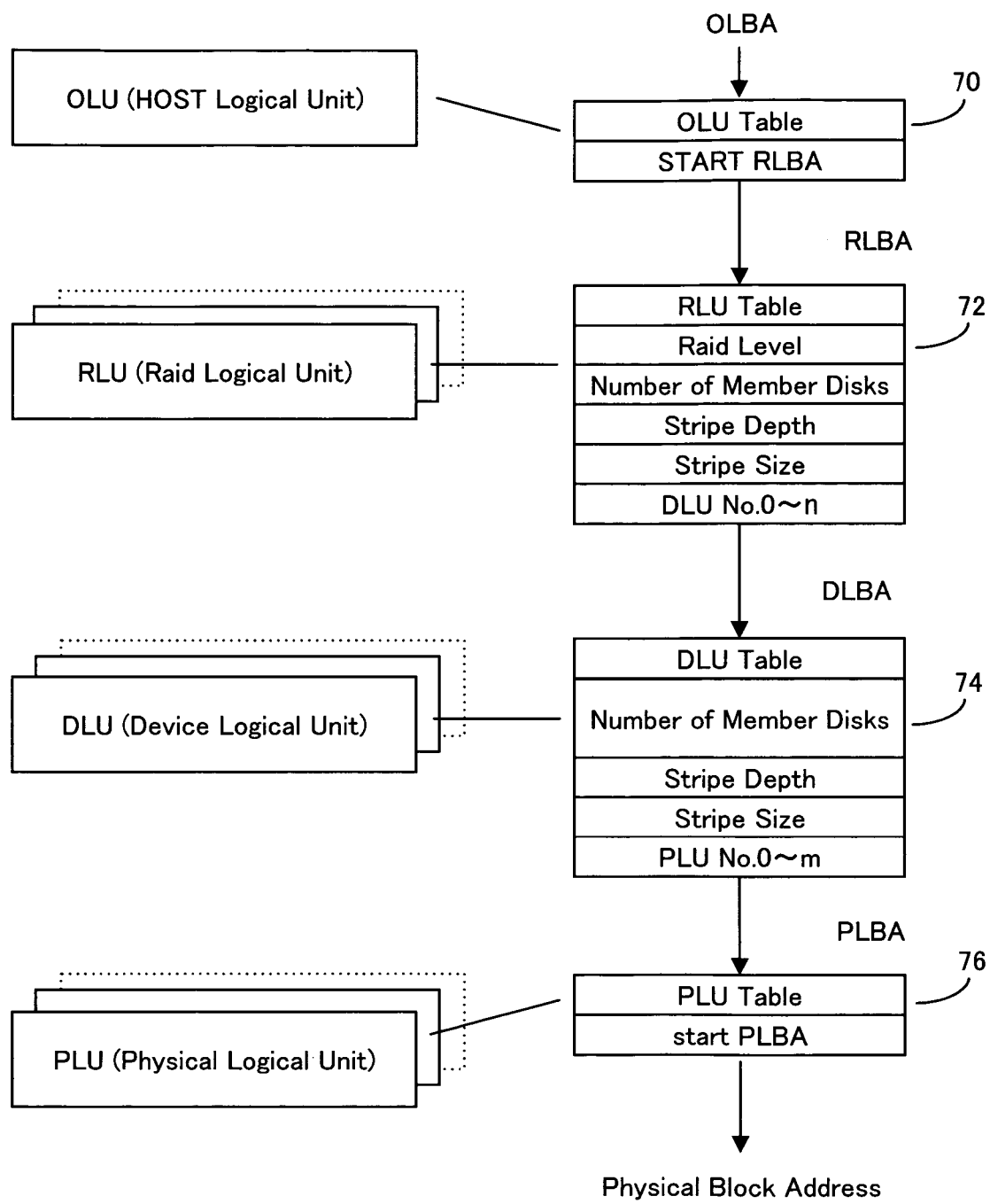
FIG. 6 is a diagram depicting disk access using the configuration definition table in FIG. 1.
Figure 7:
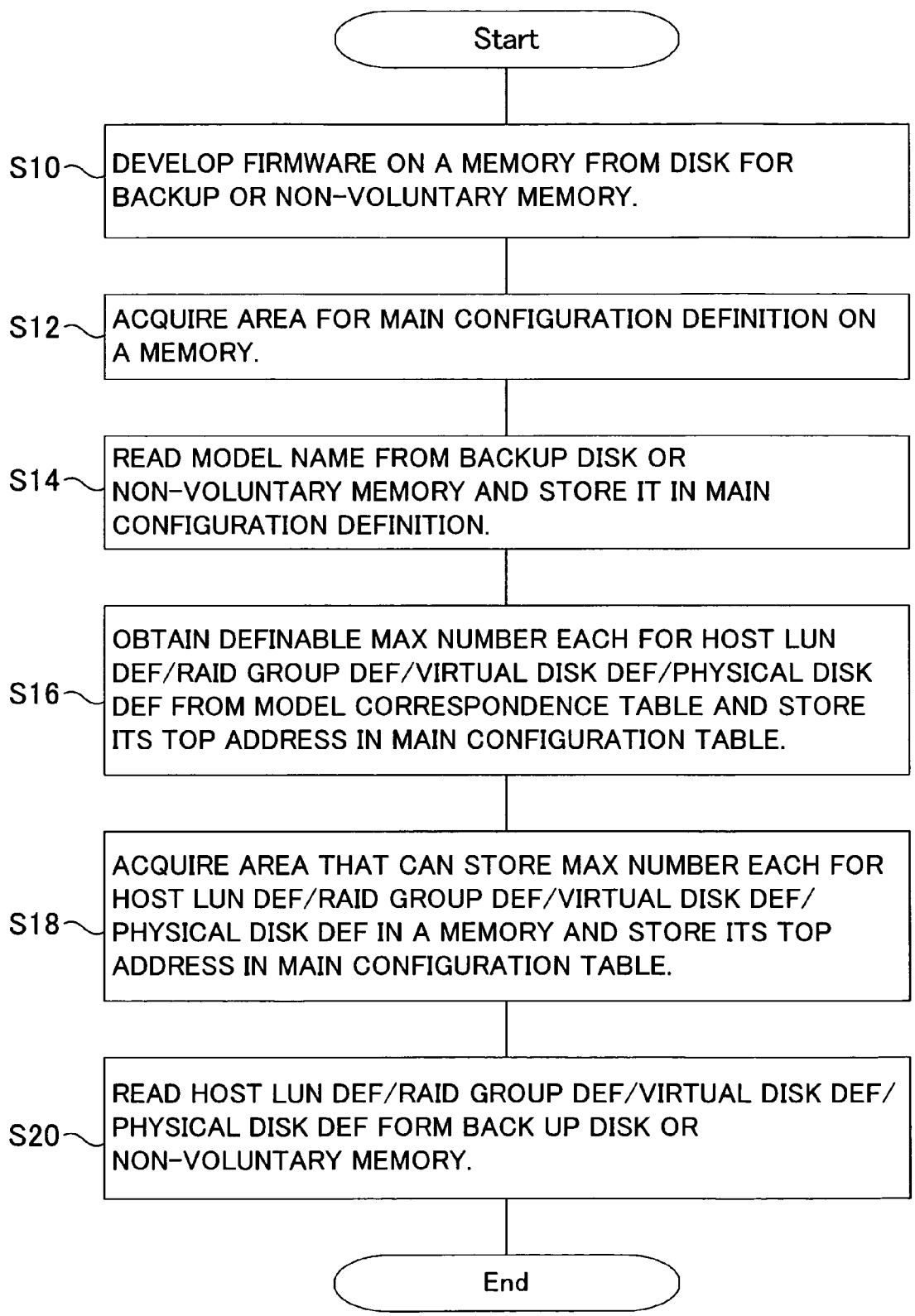
FIG. 7 is a flow chart depicting the configuration definition table creation processing in the configuration in FIG. 5.
Figure 8:
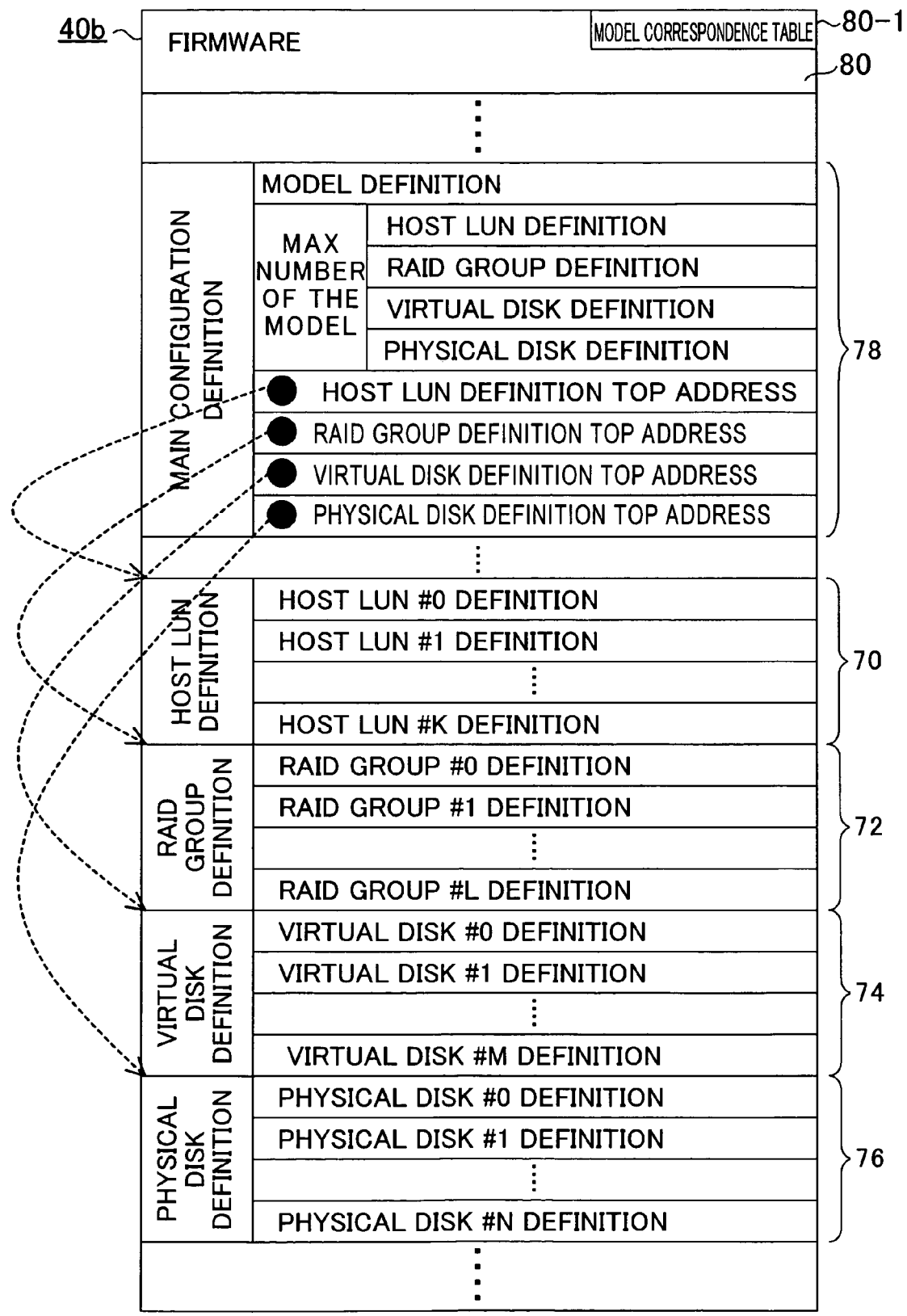
FIG. 8 shows the configuration of the configuration definition table created in FIG. 7.
Figure 9:
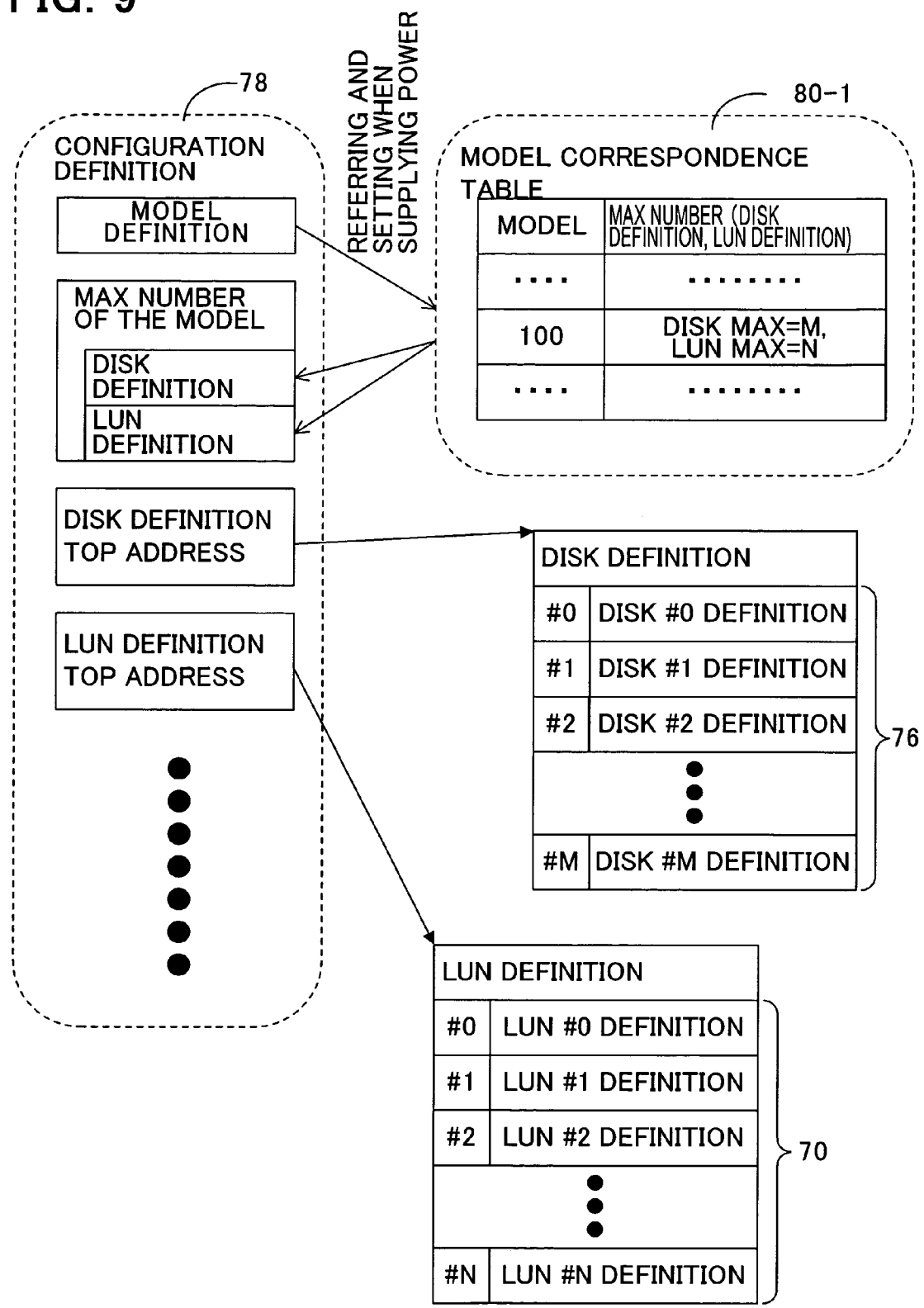
FIG. 9 is a diagram depicting the configuration definition table creation processing in FIG. 5.

FIG. 6 is a diagram depicting the RAID space, FIG. 7 is a flow chart depicting the configuration definition setup processing according to an embodiment of the present invention, FIG. 8 describes the configuration definition table, and FIG. 9 describes the configuration definition table creation operation.

At first the configuration definition table will be described with reference to FIG. 6. The RAID logical space of the disk array apparatus when viewed from the host computer is a layered structure of the OLU (host logical unit), which is a logical space of the host, an RLU (RAID logical unit) which is a logical space of the RAID group, a DLU (Device logical unit) which is a logical space of the device constituting the RAID group, and a PLU (Physical logical unit) which is a logical space of the physical disk.

The OLU space is defined by the OLU table 70 for storing the definitions of the host LUN (Logical Unit Number) which defines the logical space for each host, and specifically the OLU table 70 defines the host LUN to be connected and the logical space range thereof. In the RAID configuration, the RAID space is associated with the OLU (host logical space) by the start RLBA (RAID Logical Block Address) of the OLU table 70, and the RAID space is defined by the RLU table 72. The RLU table 72 stores the RAID level, the number of member disks, the RAID stripe depth, the RAID stripe size and the corresponding DLU number.

The DLU space is defined by the DLU table 74. The DLU table 74 stores the number of member disks, the RAID stripe depth, the RAID stripe size and the corresponding PLU number. The DLU space and the DLU table 74 are used for mirroring. The PLU space is defined by the PLU table 76. The PLU table 76 stores the start PLBA (Physical Logical Block Address).

These configuration definition tables 70-76 are created according to the model name by the processing in FIG. 7 and later. Now the configuration definition setup processing in FIG. 7 will be described with reference to FIG. 8 and FIG. 9.

(S10) The configuration management module 652 in FIG. 5 first reads the configuration definition setup firmware program 80 including the model correspondence table 80-1 from a non-volatile memory or a system disk 200-1, which is not shown in FIG. 2, and develops it in the memory 40*b* as shown in FIG. 9, and starts the configuration definition setup processing.

(S12) In the configuration definition setup processing, the area 78 for the major configuration definition is secured in the memory 40*b*. This area is the same size in each model.

(S14) The model name (e.g. model 100) which was input from the service controller 46 and stored in the non-volatile memory or the system disk 200-1, which is not shown in FIG. 2, is read and stored in the major configuration area 78.

(S16) As FIG. 9 shows, the model correspondence table 80-1 is embedded in the firmware 80. This model correspondence table 80-1 stores the maximum number of LUN definitions and disk definitions of each model. FIG. 7 and FIG. 8 show the maximum number of host LUN definitions, RAID group definitions, virtual disk definitions, and the physical disk definitions of each model. In the configuration definition setup processing, the model correspondence table 80-1 is referred to by the model name, the maximum number of host LUN definitions, RAID group definitions, virtual disk definitions and the physical disk definitions of the corresponding model are read and stored in the major configuration definition area 78 of the memory 40*b*.

(S18) Then in the configuration definition setup processing, the areas 70-76 for storing the maximum number of host LUN definitions, RAID group definitions, virtual disk definitions and the physical disk definitions are secured in the memory 40*b*, and the starting address of each area 70-76 is stored in the major configuration definition area 78 of the memory 40*b*.

(S20) Then in the configuration definition setup processing, information on the host LUN definitions, the RAID group definitions, the virtual disk definition and the physical disk definitions (configuration information) of this disk array apparatus which are stored in the non-volatile memory or system disk 200-1, which is not shown in FIG. 2, are read and stored in the areas 70-76 secured in the respective memory 40*b*.

As FIG. 8 shows, the host LUN definition area 70 stores the definition of each host LUN #0-#K (e.g. host LUN and start RLBA of this host LUN) of this disk array apparatus. The RAID group definition area 72 stores the definition of each RAID group #0-#L (e.g. RAID group name, RAID level, number of member disks, stripe depth, stripe size and the member DLU number of the RAID group) of this disk array apparatus.

The virtual disk (DLU) definition area 74 stores the definition of each virtual disk (DLU) #0-#M (e.g. DLU name, number of member disks, stripe depth, stripe size and physical member disk number of the DLU) of this disk array apparatus. The physical disk (PLU) definition area 76 stores the definition of each physical disk #0-#N (e.g. physical disk number and physical logical block address (PLBA)) of this disk array apparatus.

In this way, each item (e.g. disk definition, LUN definition) of the configuration definition table of the disk array apparatus has a variable size and each item of the configuration definition table is referred to from the first pointer. In other words, when the power is turned ON, information to indicate the definition of each model (model correspondence table) is provided on the configuration setup form, and based on this content, the maximum value of this model is recorded in the memory, and at the same time, the memory area for each item is secured. After this, the content of the actual configuration definition is developed on the memory secured from the backup disk and flash ROM, for example.

Therefore even for a diversity of models, the memory size of the configuration definition table can be decreased to a size matching the model, and common firmware can be used regardless the model. In other words, the model correspondence table is provided, so a memory area with the memory size matching the model can be secured before storing the actual content of the configuration definition.

The configuration definition table can be referred to via a pointer, so a same method can be used for reference regardless the model. For example, if it is necessary to search all data of a definition, data from the beginning of this item to the above mentioned maximum value is searched.

Access Processing of Disk Device Using Configuration Definition

Figure 10:
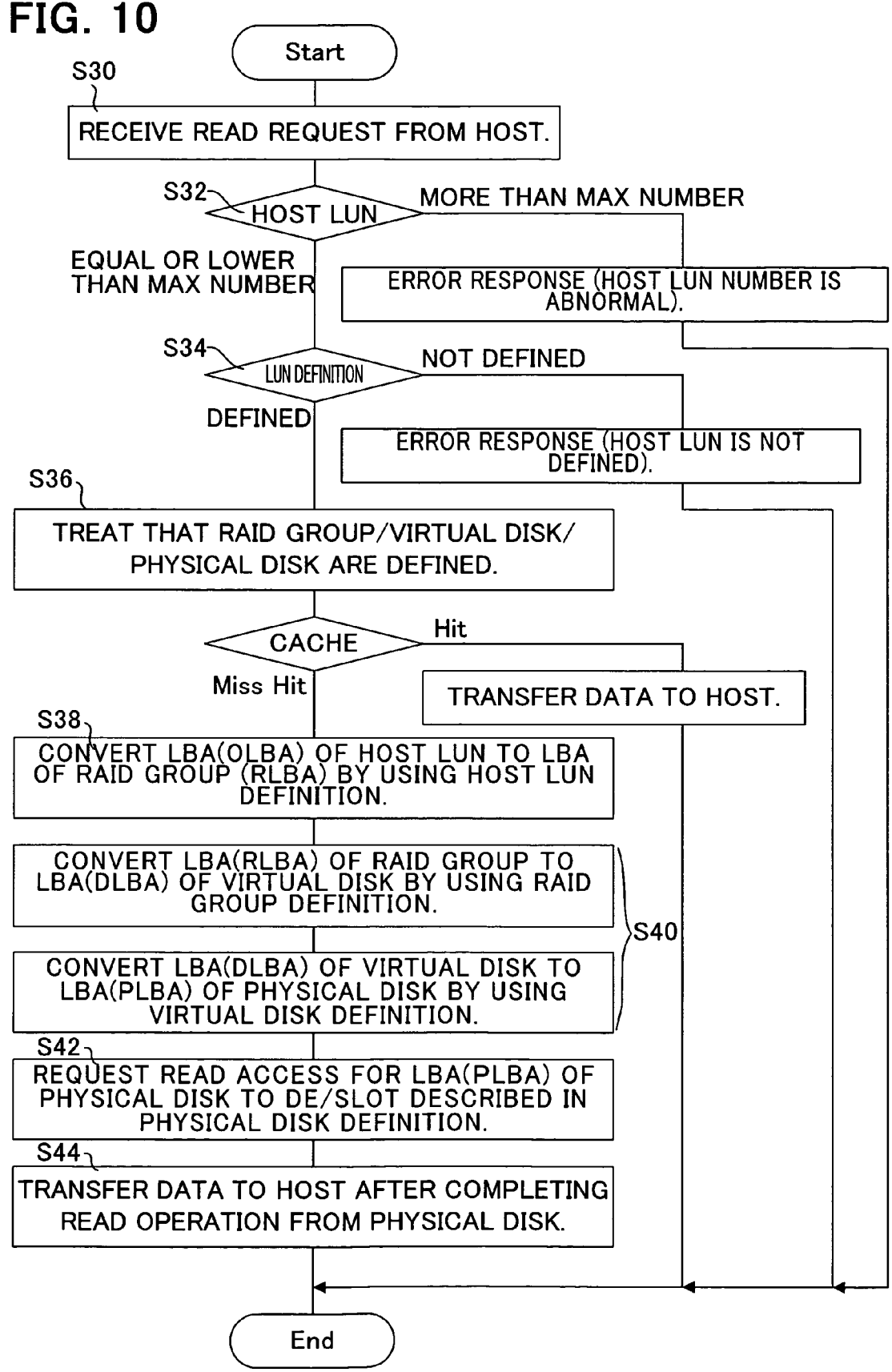
FIG. 10 is a flow chart depicting the read processing using the configuration definition table in FIG. 8.
Figure 12:
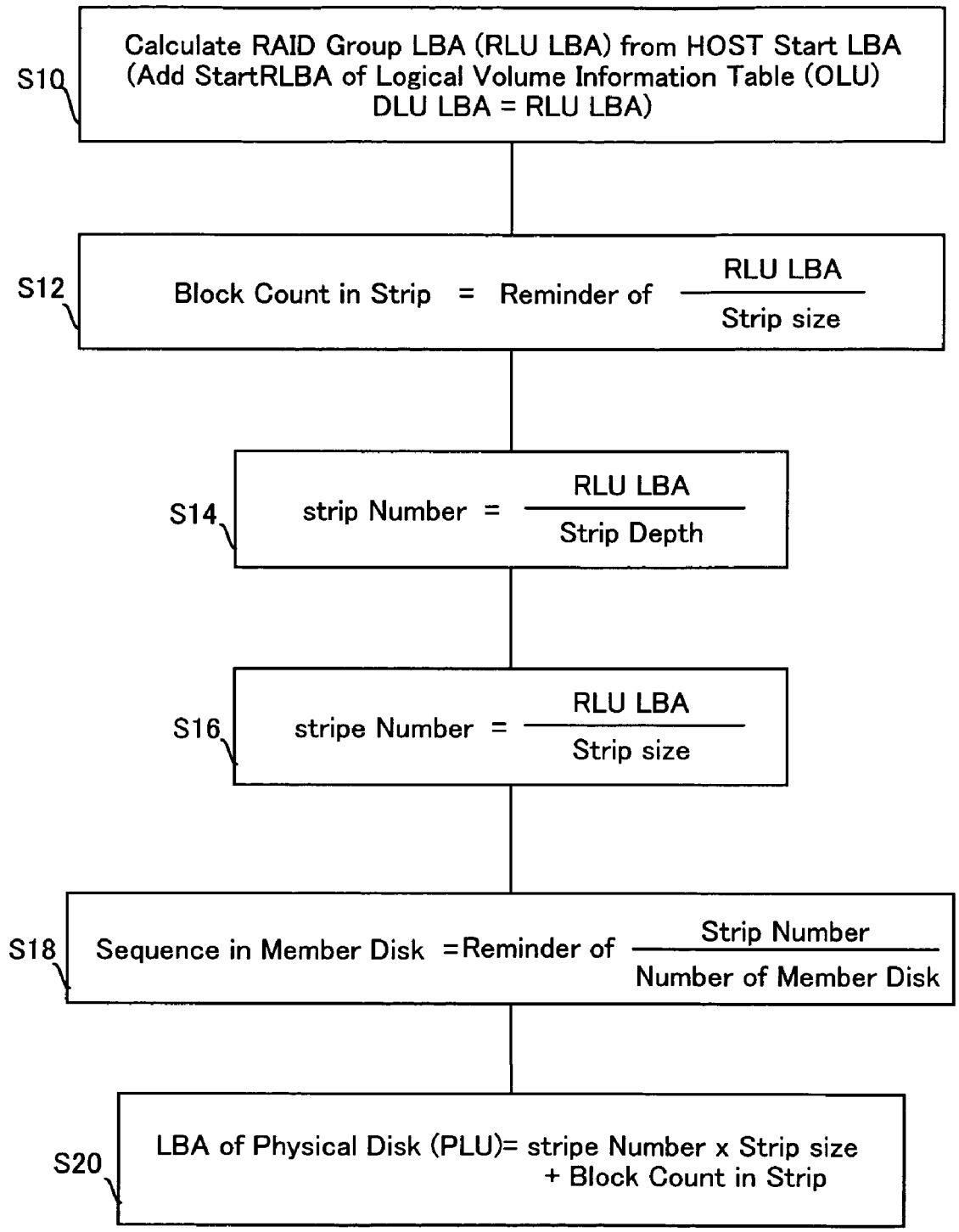
FIG. 12 is a flow chart depicting the PLBA calculation processing of the RAID 5 in FIG. 11.
Figure 13:
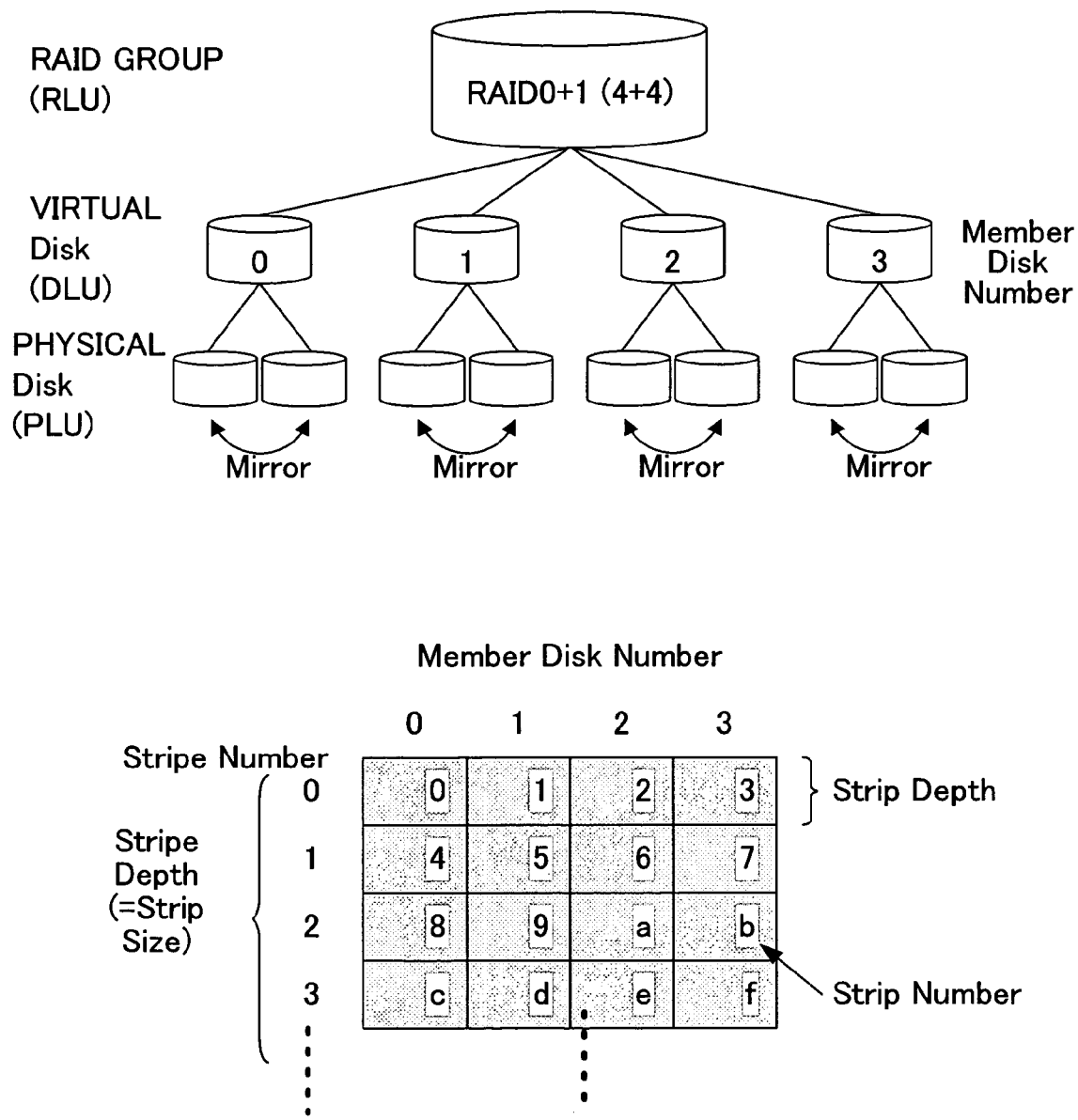
FIG. 13 is a diagram depicting the logical mapping of the RAID 0+1 in FIG. 10.
Figure 14:
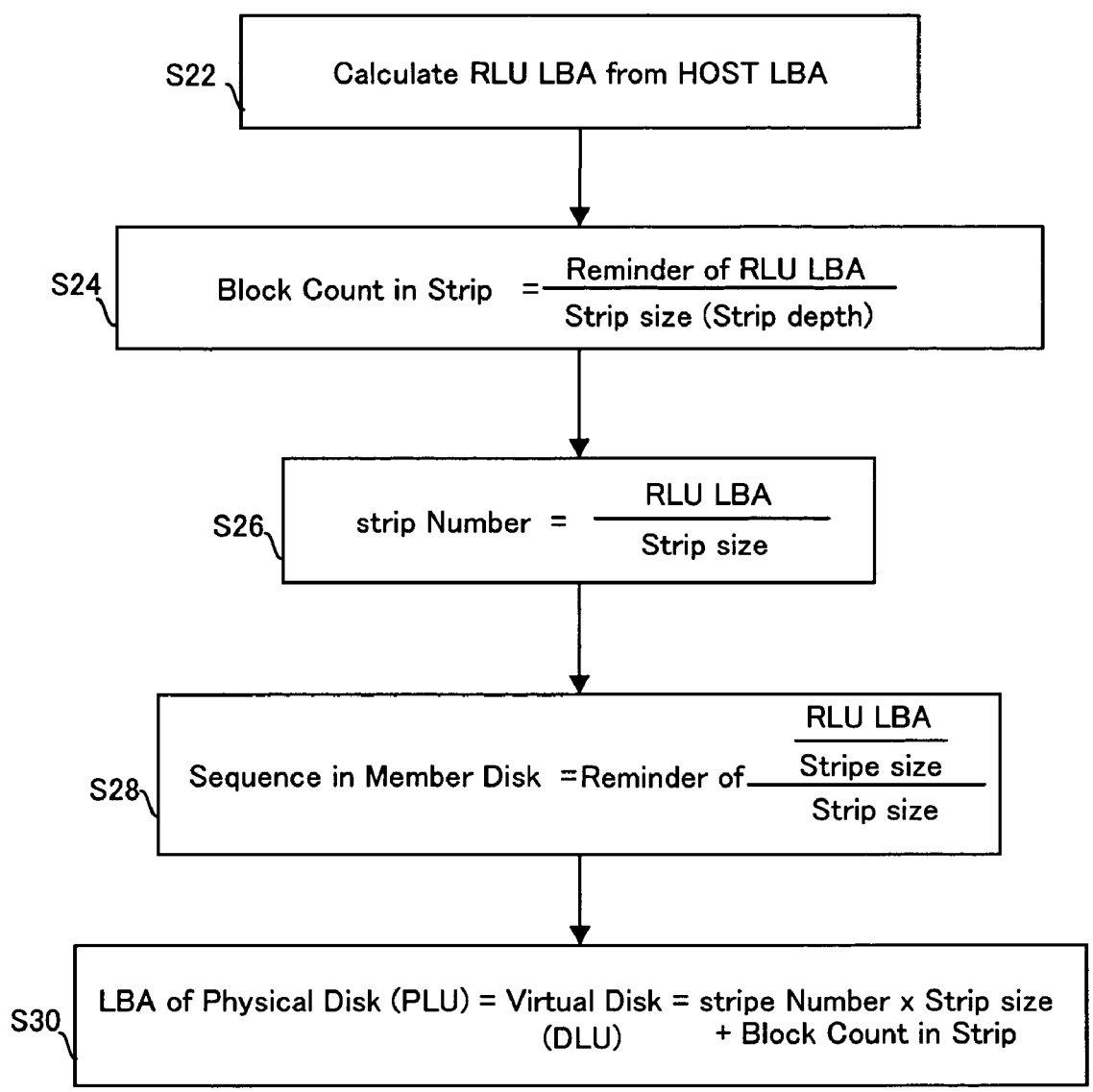
FIG. 14 is a flow chart depicting the PLBA calculation processing of the RAID 0+1 in FIG. 13.

FIG. 10 is a flow chart depicting an access processing from a host using the configuration definition of the present invention, FIG. 11 is a diagram depicting the RAID 5 in FIG. 10, FIG. 12 is a flow chart depicting the address calculation of the RAID 5 in FIG. 11, FIG. 13 is a diagram depicting the RAID 0+1 in FIG. 10, and FIG. 14 is a flow chart depicting the address calculation of the RAID 0+1 in FIG. 13.

The access processing flow in FIG. 10 with the firmware configuration in FIG. 5 will be described with reference to FIG. 11 to FIG. 14.

(S30) When the CA 41 receives the read request from the host, the CA 41 notifies this to the resource module 642 via the CM-CA driver 620, and the resource module 642 accepts this read request.

(S32) The resource module 642 judges whether the host LUN (Logical Unit Number) which came with the read request is higher than the maximum number of host LUN definitions in the major configuration definition area 80 of the memory 40b. If it is higher than the maximum number, this means that the specified host LUN is an abnormal value, so the resource module 642 responds with an error from the CA 41 to the host via the CM-CA driver 620.

(S34) If it is not higher than the maximum number, this means that the specified host LUN is normal, so the resource module 642 sequentially refers to the host LUN definition of the host LUN definition (OLU) table 70 using the host LUN definition starting address of the major configuration definition area 80 of the memory 40b, and judges whether the specified host LUN has been defined. When the resource module 642 judges that the specified host LUN has not been defined in the host LUN definition table 70, the resource module 642 responds with an error from the CA 41 to the host via the CM-CA driver 620.

(S36) If the host LUN has been defined, on the other hand, the resource module 642 judges that the RAID group/virtual disk/physical disk have been defined, and requests the cache module 648 to judge a cache hit. The cache module 648 checks whether the data of the LBA (OLBA) of the target host LUN exists in the cache area of the memory 40b, and if it exists (hit), the cache module 648 reads the data of the OLBA (host Logical Block Address) of the memory 40b, and transfers the data from the CA 41 to the host via the CM-CA driver 620.

(S38) If it is judged that the data of LBA (OLBA) of the target host LUN does not exist in the cache area of the memory 40b (miss hit), on the other hand, the cache module 648 requests a data read from the physical disk to the RAID module 632 of the back end. The RAID module 632 converts the LBA (OLBA) of the host LUN, which is requested processing, into the LBA (RLBA) of the RAID group using the start RLBA of the host LUN definition area (table) 70 of the memory 40b.

(S40) Then, as shown in FIG. 6, the RAID module 632 converts the LBA (RLBA) of the RAID group into the LBA (DLBA) of the virtual disk using the definition of the RAID group definition area (table) 72 of the memory 40b. Then the RAID module 632 converts the LBA (DLBA) of the virtual disk, which is requested processing, into the LBA (PLBA) of the physical disk using the definition of the virtual disk definition area (table) 74 of the memory 40b. An example of this processing will be described later in FIG. 11 to FIG. 14.

(S42) Now the RAID module 632 determines the disk enclosure RAID and the slot from the LBA (PLBA) of the physical disk, which is requested processing, using the physical disk definition area (table) 76 of the memory 40b, and sends a read request to the LBA (PLBA) of the physical disk 200. In other words, the RAID module 632 sends the read request of the physical disk to the corresponding DA 42 via the CM-DA driver 630 and accesses the physical disk via the BRT 5-0.

(S44) When the data is read from the physical disk and the cache module 648 stores the read data in the cache area of the memory 40b via the DA 42 and completes reading, the resource module 642 transfers this read data from the CA 41 to the host via the CM-CA driver 620, and the processing ends.

FIG. 11 and FIG. 12 describe the above mentioned address conversion processing. As FIG. 11 shows, in the case of the RAID 5 (3+1), RLU=DLU, the RLU table 72 is RAID level=RAID 5, the number of member disks=4, and the corresponding DLU number=PLU number (0–3). The RAID space is striped by the member disks, and the RAID space is mapped by the member disk number and the stripe number. This matrix is called a strip where strip numbers are assigned. The strip size is defined by Strip Depth (or Stripe Depth), and the size of one stripe is defined by Stripe Size.

Therefore as described in FIG. 12, R (RAID group) LBA can be converted in the sequence of PLBA and the member disk using the number of member disks, Strip Depth and Stripe Size.

(S50) RLBA (RLULBA) is determined by adding the start RLBA of the OLU table 70 to the host LBA (OLBA: Logical Block Address).

(S52) The block count in the strip is calculated by the remainder of RLULBA (RLBA)/Strip Size (Stripe Depth).

(S54) The strip number is calculated by RLULBA (RLBA)/Strip Depth.

(S56) The Stripe number is calculated by RLULBA (RLBA)/Stripe Size.

(S58) The sequence of the member disk is calculated by the remainder of the stripe number/number of member disks.

(S60) The LBA of the physical disk (PLU) is calculated by (Stripe number×Strip Size)+the block count in the Strip.

By this, the actual block address is calculated using the PLU table 76 by the sequence of the member disk (PLU number) and PLULBA (PLBA).

In the same way, as FIG. 13 shows, in the case of the RAID 0+1 (4+4), RLU≠DLU, the RLU table 72 is RAID level=RAID 0+1, the number of member disks=4 (DLU), and the corresponding DLU number=0-3. The RAID space is striped by the DLU member disks, and the RAID space is mapped by the DLU member disk number and the stripe number. This matrix is called a strip where strip numbers are assigned. This Strip Size is defined by the Strip Depth (or Stripe Depth), and the size of one stripe is defined by Stripe Size.

Therefore as described in FIG. 14, R (RAID) group LBA can be converted in the sequence of PLULBA and the member disk using the number of member disks, Strip Depth and Stripe Size, can be converted in the sequence of PLULBA and the member disk.

(S62) RLBA is determined by adding the start RLBA of the OLU table 70 to the host LBA (Logical Block Address).

(S64) The block count in the strip is calculated by the remainder of RLULBA/Stripe Depth.

(S66) The Stripe number is calculated by PLULBA/Stripe Size.

(S68) The sequence of the member disk is calculated by (remainder of RLULBA/Stripe Size)/Strip Size.

(S70) The PLBA (=disk of DLU) of the physical disk (PLU) is calculated by (Stripe number×Stripe Size)+the block count in the Strip.

By this, the actual block address is calculated using the PLU table 76 in the sequence of the member disk (DLU number) and PLULBA (PLBA).

For the write processing from the host, the write data is first stored in the cache area of the memory 40b, then is written back to the physical disk according to the internal write back schedule. For this write back as well, address conversion processing using the configuration definition table in steps S38-S42 after a miss hit is performed.

When the configuration definition table of the memory 40b is referred to via the pointer in this way, the same firmware can be used regardless the model.

OTHER EMBODIMENTS

Figure 15:
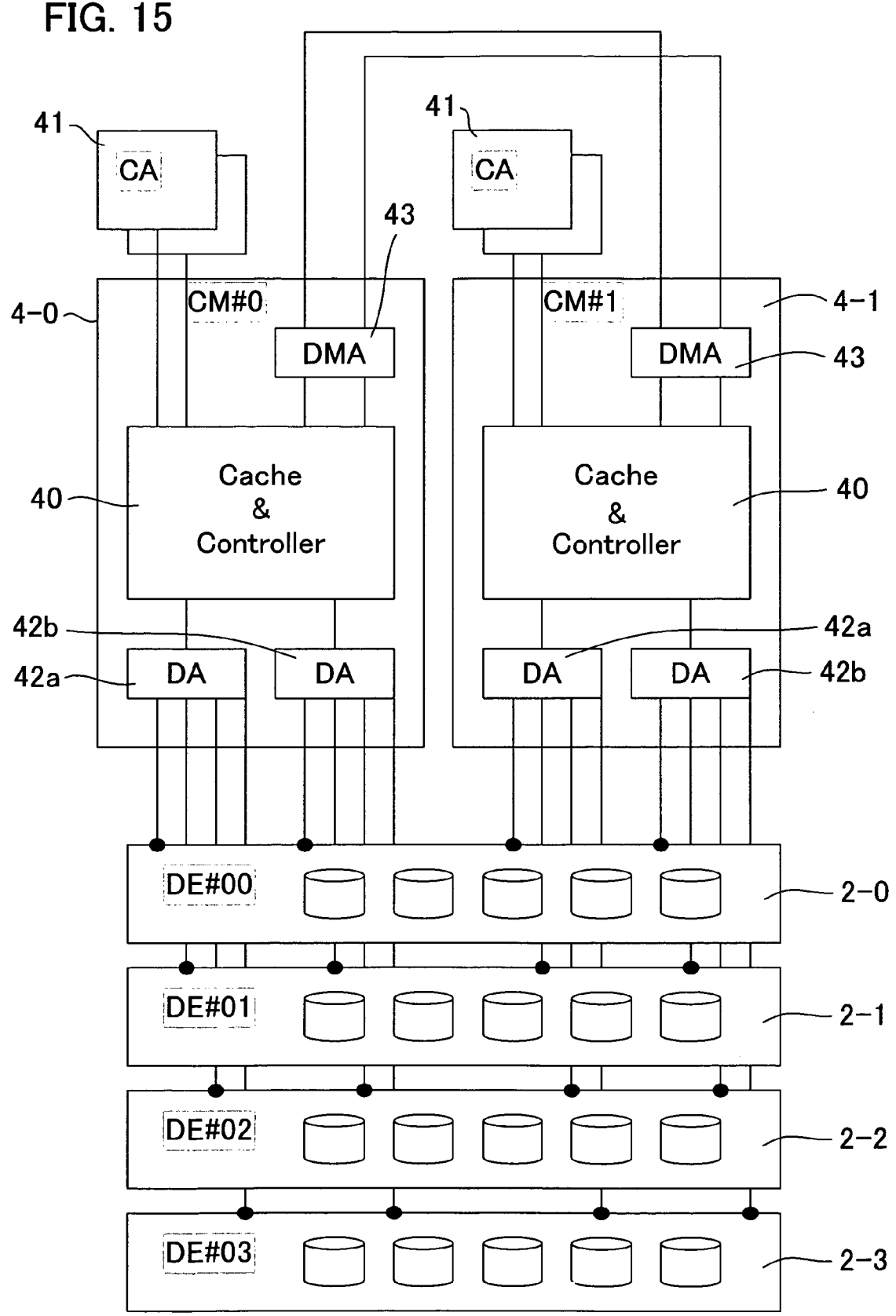
FIG. 15 is a block diagram depicting a small scale disk array apparatus according to an embodiment of the present invention.
Figure 16:
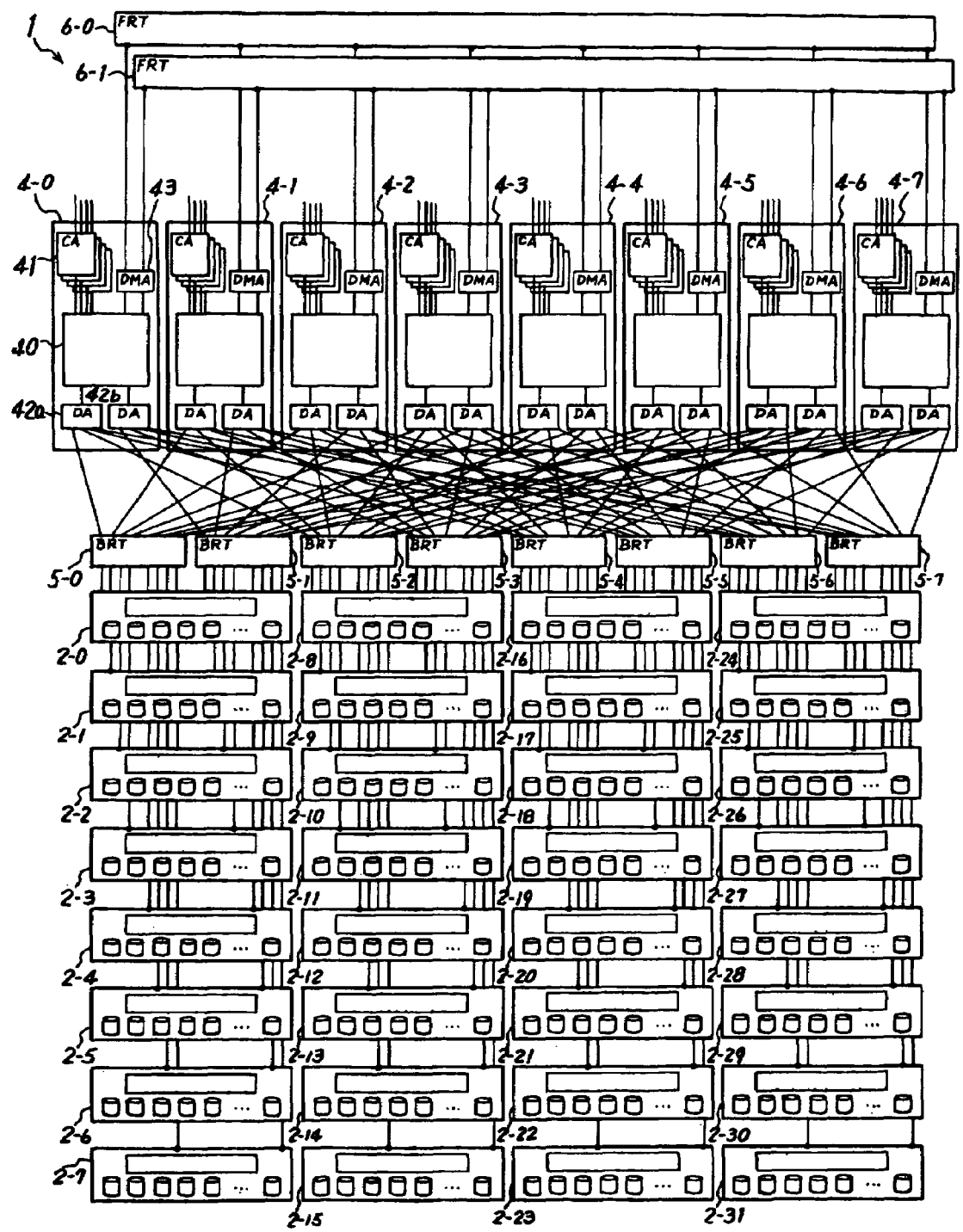
FIG. 16 is a block diagram depicting a large scale disk array apparatus according to an embodiment of the present invention.

Now small scale (minimum model) and large scale (maximum model) disk array apparatus will be described. FIG. 15 is a block diagram depicting the small scale disk array apparatus to which the present invention is applied, FIG. 16 is a block diagram depicting the large scale disk array apparatus to which the present invention is applied, and FIG. 17 is a table showing a comparison of the required memory size of the configuration definition table between the small scale disk array apparatus in FIG. 15 and the large scale disk array apparatus in FIG. 16.

In the configuration of the minimum model in FIG. 15, composing elements the same as FIG. 1 are denoted with the same reference symbols. As FIG. 15 shows, the disk array apparatus 1 has four disk enclosures 2-0-2-3 for holding data, and two control modules 4-0 and 4-1 disposed between a host computer (data processing apparatus), which is not illustrated, and a plurality of disk enclosures 2-0-2-3.

Each control module 4-0-4-1 has a controller 40, a channel adapter (denoted as CA in figures) 41, disk adapters (denoted as DA in figures) 42a and 42b, and a DMA (Direct Memory Access) engine (denoted as DMA in figures) 43.

In this minimum model, the maximum number of physical disk devices 200 is "240, as shown in FIG. 17, that is 60 disk drives 200 can be installed for each disk enclosure 2-0-2-3. The number of virtual disks is a maximum of 120, and the number of RAID groups is a maximum of 120, and the number of host LUNs is a maximum of 1920. This is stored in the model correspondence table 80-1 of this model (e.g. model 100).

In the configuration of the maximum model shown in FIG. 16 as well, composing elements the same as FIG. 1 are denoted with the same reference symbols. As FIG. 16 shows, the disk array apparatus 1 has thirty two disk enclosures 2-0-2-31 for holding data, eight control modules 4-0-4-7 disposed between the host computer (data processing apparatus), which is not illustrated, and the plurality of disk enclosures 2-0-2-31, eight back end routers (first switch unit: denoted as BRT in figures and hereafter referred to as BRT) 5-0-5-7 disposed between the plurality of control modules 4-0-4-7 and the plurality of disk enclosures 2-0-2-31, and two front end routers (second switch unit: denoted as FRT in figures and hereafter referred to as FRT) 6-0 and 6-1.

Each of the control modules 4-0-4-7 has a controller 40, a channel adapter (denoted as CA in figures) 41, disk adapters (denoted as DA in figures) 42a and 42b, and a DMA (Direct Memory Access) engine (communication unit: denoted as DMA in figures) 43.

In this maximum model, as FIG. 17 shows, the maximum number of physical disk devices 200 is "3840", that is 120 disk drives 200 can be installed for each disk enclosure 2-0-2-31. The number of virtual disks is a maximum of 1920, the number of RAID groups is a maximum of 1920, and the number of host LUNs is a maximum of 30720. This is stored in the model correspondence table 80-1 of this model (e.g. model 900).

As FIG. 8 shows, if the size to be used for-one element of the table is 256 bytes, then the memory size required for the configuration definition tables 70-76 in the case of the minimum model (FIG. 15) is (1920+120+120+240)×256=614400 bytes=0.6144 Mbytes.

In the same way, if the size for one element of the table is 256 bytes, then the memory size to be required for the configuration definition tables 70-76 in the case of the maximum model (FIG. 16) is (30720+1920+1920+3840)×256=9830400 bytes=9.8304 Mbytes.

Therefore the required memory size is one digit different between the minimum model and the maximum model, and in this example, there is a 9.2 Mbyte difference. So it is extremely effective in terms of cost to set the size of the configuration definition table according to the model.

In the above embodiments, the disk array apparatus having the configuration in FIG. 1 was described, but the present invention can be applied to disk array apparatus having other configurations. For the physical disk, a magnetic disk, an optical disk, a magneto-optical disk and various storage devices can be used.

The present invention can also be applied to a disk array apparatus that does not use a RAID configuration. In this case, the host LBA is converted into a virtual disk LBA.

The present invention was described by the embodiments, but the present invention can be modified in various ways within the scope of the essential character of the present invention, which shall not be excluded from the scope of the present invention.

As described above, information to show the definitions of each model (model correspondence table) is provided in the configuration setup processing, and based on this content, the maximum values of a model are recorded in a memory, and at the same time a memory area for each item is secured, and after this the actual content of the configuration definition is developed on the memory secured from a backup disk or flash ROM, for example. Because of this, even for a diversity of models, the memory size of the configuration definition table can be decreased to a size matching the model, and common firmware can be used regardless the model. The configuration definition table is referred to via a pointer, so the same method can be used for reference regardless the model. As a result, configuration definition creation for a diversity of models becomes possible, and these models can be quickly provided to market.

What is claimed is:

1. A method for setting up a configuration definition of a disk array apparatus that accesses connected disk devices according to an I/O request sent from a host and executes the I/O request, comprising the steps of:

referring to a model correspondence table stored in a non-volatile memory for storing a maximum number of each of a host logical space, RAID space, virtual disk space and said disk devices of each model by a model name indicating a scale of said disk array apparatus and reading the corresponding maximum number of each of said host logical space, RAID space, virtual disk space and said disk devices;

storing said corresponding maximum number of each of said host logical space, RAID space, virtual disk space and said disk devices into one area of a memory;

securing each area in said memory for storing configuration information of the maximum number of each of said host logical space, RAID space, virtual disk space and said disk devices from the maximum number of each of said host logical space, RAID space, virtual disk space and said disk devices that were stored into said one area of said memory;

reading said configuration information of each of said host logical space, RAID space, virtual disk space and said disk devices of said model name from said non-volatile memory; and storing each of said configuration information from a respective starting address of said each area into each area of said memory, storing said respective starting address in said memory and creating a configuration definition table for calculating a physical block address of said disk device from a host logical block address and accessing said disk devices.

2. The configuration definition setup method for a disk array apparatus according to claim 1, further comprising a step of storing said created configuration definition table in a non-volatile memory.

3. The configuration definition setup method for a disk array apparatus according to claim 1, wherein said storing step comprises a step of storing said configuration definition table in an area other than a cache area of a memory used for said cache area of said disk device.

4. A disk array apparatus for accessing connected disk devices according to an I/O request sent from a host and executing the I/O request, comprising:

a non-volatile memory for storing a model name to indicate a scale of said disk array apparatus, a model correspondence table storing the maximum number of each of a host logical space, RAID space, virtual disk space and said disk devices of said respective model, and configuration information of said host logical space, RAID space, virtual disk space and said disk devices;

a memory for storing a configuration definition table for accessing said disk devices; and a control unit for referring to said configuration definition table and accessing said disk device according to said sent I/O request, wherein said control unit refers to said model correspondence table in said non-volatile memory by said model name, reads said corresponding the maximum number of each of said host logical space, RAID space, virtual disk space and said disk devices, stores said corresponding maximum number of each of said host logical space, RAID space, virtual disk space and said disk devices into one area of said memory, secures each area in said memory for storing configuration information of the maximum number of each of said host logical space, RAID space, virtual disk space and said disk devices from the maximum number of each of a host logical space, RAID space, virtual disk space and said disk devices which stored in said one area of said memory, reads said configuration information of each of said host logical space, RAID space, virtual disk space and said disk devices from said non-volatile memory, and stores each of said configuration information from respective starting address to said each area of memory and creates said configuration definition tables, and wherein said control unit stores said respective starting address in said memory.

5. The disk array apparatus according to claim 4, wherein said control unit refers to said configuration definition table, and calculates a physical block address of said disk device from a host logical block address.

6. The disk array apparatus according to claim 4, wherein said control unit stores said created configuration definition table in the non-volatile memory.

7. The disk array apparatus according to claim 4, wherein said control unit stores said configuration definition table in an area other than a cache area in a memory used for said cache area of said disk device.

8. The disk array apparatus according to claim 4, wherein said non-volatile memory is constructed by a system disk that is allocated to a part of said disk device.

9. The disk array apparatus according to claim 4, wherein said configuration definition table further comprises:

a host logical space table for defining said host logical space;

a RAID space table for defining said RAID space group;

a virtual disk table for defining said virtual disk space for a virtual disk apparatus of said RAID space group; and a physical disk table for defining said disk device.

10. The disk array apparatus according to claim 4, wherein said configuration definition table stores a host logical unit definition, a RAID group definition, a virtual disk definition and a physical disk definition as said configuration information.

11. The disk array apparatus according to claim 4, wherein said control unit refers to said configuration definition table using said respective start address and determines said disk device to be accessed according to said sent I/O request.

* * * * *

UNITED STATES PATENT AND TRADEMARK OFFICE
CERTIFICATE OF CORRECTION

PATENT NO. : 7,725,664 B2
APPLICATION NO. : 11/239230
DATED : May 25, 2010
INVENTOR(S) : Hidejirou Daikokuya et al.

It is certified that error appears in the above-identified patent and that said Letters Patent is hereby corrected as shown below:

Column 16, Line 10 delete "tables," and insert --table,--.

Signed and Sealed this

Twenty-sixth Day of October, 2010

David J. Kappos
*Director of the United States Patent and Trademark Office*